United States Patent
McRitchie et al.

(10) Patent No.: US 11,694,032 B2
(45) Date of Patent: Jul. 4, 2023

(54) TEMPLATE-BASED INTENT CLASSIFICATION FOR CHATBOTS

(71) Applicant: Oracle International Corporation, Redwood Shores, CA (US)

(72) Inventors: Stephen Andrew McRitchie, Palo Alto, CA (US); Sunghye Jeon, San Mateo, CA (US)

(73) Assignee: Oracle International Corporation, Redwoood Shores, CA (US)

( * ) Notice: Subject to any disclaimer, the term of this patent is extended or adjusted under 35 U.S.C. 154(b) by 230 days.

(21) Appl. No.: 17/011,296

(22) Filed: Sep. 3, 2020

(65) Prior Publication Data

US 2021/0081615 A1 Mar. 18, 2021

Related U.S. Application Data

(60) Provisional application No. 62/899,691, filed on Sep. 12, 2019.

(51) Int. Cl.
| | |
|---|---|
| *G06F 40/30* | (2020.01) |
| *H04L 51/02* | (2022.01) |
| *G06F 40/247* | (2020.01) |
| *G06F 40/253* | (2020.01) |
| *G06F 40/295* | (2020.01) |

(52) U.S. Cl.
CPC ............ *G06F 40/30* (2020.01); *G06F 40/247* (2020.01); *G06F 40/253* (2020.01); *G06F 40/295* (2020.01); *H04L 51/02* (2013.01)

(58) Field of Classification Search
None
See application file for complete search history.

(56) References Cited

U.S. PATENT DOCUMENTS

| | | | |
|---|---|---|---|
| 10,600,406 B1 * | 3/2020 | Shapiro | .................. G10L 15/22 |
| 10,649,985 B1 * | 5/2020 | Cornell, Jr | ............ G06F 16/245 |

(Continued)

OTHER PUBLICATIONS

Rychalska, Barbara, Helena Glabska, and Anna Wroblewska. "Multi-intent hierarchical natural language understanding for chatbots." In 2018 Fifth international conference on social networks analysis, management and security (SNAMS), pp. 256-259. IEEE, 2018. (Year: 2018).*

*Primary Examiner* — Frank D Mills
(74) *Attorney, Agent, or Firm* — Kilpatrick Townsend & Stockton LLP

(57) ABSTRACT

The present disclosure relates to chatbot systems and, more particularly, to techniques for determining that an input utterance is representative of a task that a particular chatbot can perform, based on matching the input utterance to a template. Techniques are also described for generating templates based on example utterances that have been provided for a chatbot. In certain embodiments, an initial set of templates is generated based on example utterances. This initial set of templates is then refined using template generalization techniques, which can be performed at the word or sentence level to generate a final set of templates for use at runtime, when the templates are matched against user utterances. The final set of templates may include one or more generalized templates that were derived from the initial set of templates and may also include the initial set of templates.

17 Claims, 12 Drawing Sheets

(56) References Cited

U.S. PATENT DOCUMENTS

| | | | | |
|---|---|---|---|---|
| 2010/0057463 | A1* | 3/2010 | Weng | G06F 40/40 |
| | | | | 704/E15.001 |
| 2014/0358889 | A1* | 12/2014 | Shmiel | G06F 40/258 |
| | | | | 707/710 |
| 2015/0348565 | A1* | 12/2015 | Rhoten | G06F 16/243 |
| | | | | 704/270.1 |
| 2016/0094492 | A1* | 3/2016 | Li | H04L 51/04 |
| | | | | 709/206 |
| 2017/0180284 | A1* | 6/2017 | Smullen | H04L 69/14 |
| 2017/0364520 | A1* | 12/2017 | Venkataraman | G10L 15/26 |
| 2018/0075335 | A1* | 3/2018 | Braz | G06F 16/24522 |
| 2018/0233141 | A1* | 8/2018 | Solomon | G06F 18/41 |
| 2018/0357096 | A1* | 12/2018 | McConnell | G06F 9/466 |
| 2018/0358006 | A1* | 12/2018 | McConnell | G06F 40/295 |
| 2018/0365228 | A1* | 12/2018 | Galitsky | G06F 40/35 |
| 2019/0295537 | A1* | 9/2019 | Sapugay | G06F 40/205 |
| 2019/0370629 | A1* | 12/2019 | Liu | G06N 5/041 |
| 2020/0356632 | A1* | 11/2020 | Roisman | G06F 16/90332 |

* cited by examiner

TEMPLATE-BASED INTENT CLASSIFICATION FOR CHATBOTS

CROSS-REFERENCE TO RELATED APPLICATIONS

The present application claims the benefit and priority under 35 U.S.C. 119(e) of U.S. Application No. 62/899,691, filed on Sep. 12, 2019, entitled "TEMPLATE BASED INTENT CLASSIFICATION FOR CHATBOTS," which is herein incorporated by reference in its entirety.

TECHNICAL FIELD

The present disclosure relates to chatbot systems and, more particularly, to techniques for determining that an input utterance is representative of a task that a particular chatbot can perform, based on matching the input utterance to a template.

BACKGROUND

Chatbots provide an interface for conversations with human users. Chatbots can be configured to perform various tasks in response to user input provided during a conversation. The user input can be supplied in various forms including, for example, audio input and text input. Thus, natural language understanding (NLU), speech-to-text, and other linguistic processing techniques may be employed as part of the processing performed by a chatbot. In some computing environments, multiple chatbots are available for conversing with a user, with each chatbot handling a different set of tasks.

One of the challenges to implementing a chatbot system is determining whether an item of user input (e.g., an utterance expressing a request or query) should be processed by a particular chatbot. In order to determine whether a chatbot is capable of processing an item of user input (e.g., fulfilling a request or answering a question), the meaning of the user input should be determined based on analysis of the content of the user input.

BRIEF SUMMARY

The present disclosure relates to chatbot systems and, more particularly, to techniques for determining that an input utterance is representative of a task that a particular chatbot can perform, based on matching the input utterance to a template. Various embodiments are described herein, including methods, systems, non-transitory computer-readable storage media storing programs, code, or instructions executable by one or more processors, and the like.

In certain computing environments, multiple chatbots are available for conversing with a user, with each chatbot handling a different set of tasks. In such environments, a user request or query in a user input could be handled expediently if an early determination were made as to which chatbot, if any, is capable of handling the request or query. Described herein are various techniques for classifying an intent of a user input based on matching an input utterance to a template. In some embodiments described herein, a rule-based classifier is configured to identify chatbots by matching utterances to templates. In certain embodiments, classification involves comparing an input utterance to a set of templates, where each template is a regular expression (regex) and is associated with a particular chatbot. Techniques are also described for generating one or more templates for a chatbot based on example utterances that have been provided for the chatbot. In certain embodiments, an initial set of templates is generated based on example utterances. This initial set of templates is then refined using template generalization techniques that can be performed at the word level or sentence level, or both, to generate a final set of templates for use at runtime, when the templates are matched against user utterances. The final set of templates may include one or more generalized templates that were derived from the initial set of templates and may also include the initial set of templates.

In certain embodiments, a method includes receiving, at a computer-implemented chatbot system, an input utterance from a user. The chatbot system determines based on a set of templates that the input utterance is representative of a task that a first chatbot in the chatbot system is configured to perform. For instance, to make this determination, the chatbot system may compare the input utterance to individual templates in the set of templates. A first template in the set of templates is a regular expression that includes a string pattern, such that the string pattern corresponds to a generalized form of one or more example utterances that have been provided for the first chatbot, and the one or more example utterances are representative of a task that the first chatbot is configured to perform. For the chatbot system, making the determination further includes calculating, for each template in the set of templates, a corresponding score based on a degree of match between the input utterance and the template. Based on the calculated scores, the chatbot system determines that, among the set of templates, the first template best matches the input utterance and, thus, the first chatbot is appropriate for handling the input utterance. Responsive to determining that the input utterance is representative of the task that the first chatbot is configured to perform, the chatbot system communicates at least part of the input utterance to the first chatbot as input.

The foregoing, together with other features and embodiments will become more apparent upon referring to the following specification, claims, and accompanying drawings.

DETAILED DESCRIPTION

Figure 1:
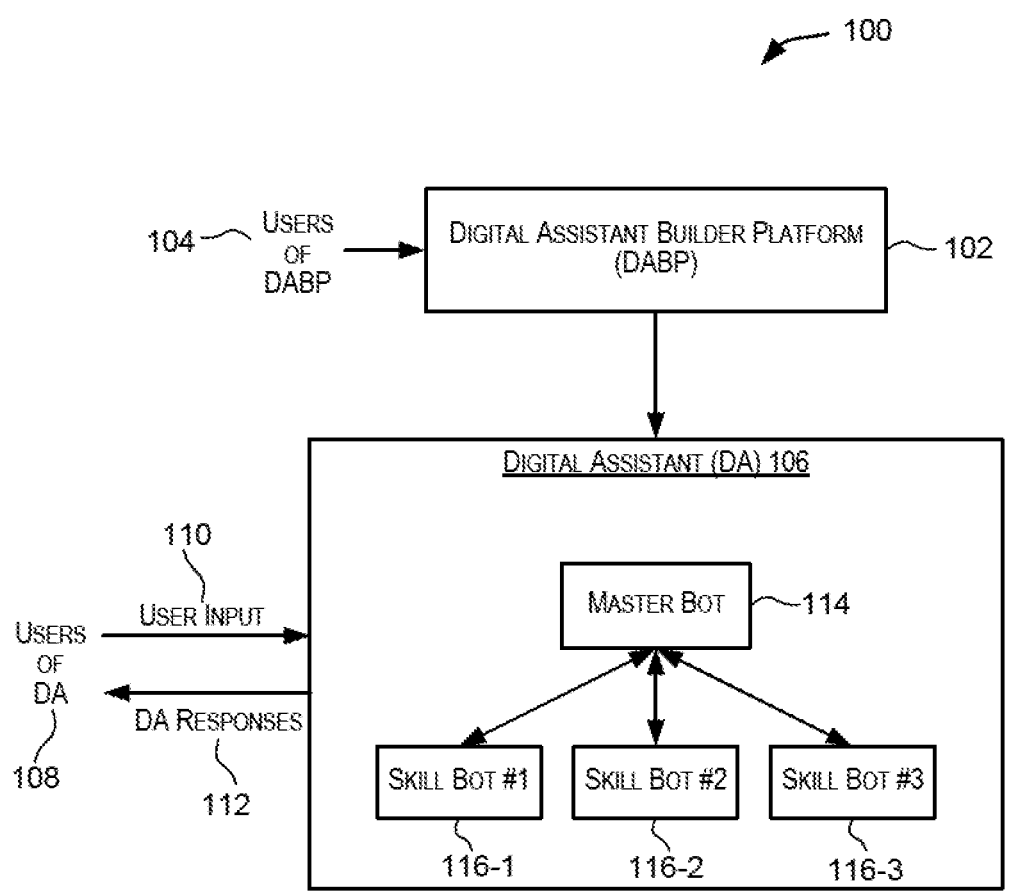
FIG. 1 is a simplified block diagram of an environment incorporating a chatbot system according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

In some computing environments, multiple chatbots are available for conversing with a user, with each chatbot handling a different set of tasks. In such environments, a user request or query could be handled more expediently if an early determination were made as to which chatbot, if any, is capable of handling the request or query. Described herein are various techniques for classifying an intent of a user input based on matching an input utterance to a template. Certain embodiments described herein improve the technical field of digital assistants and chatbots by providing a technique for directing user input to an appropriate chatbot in a case where multiple chatbots are available with varying skillsets, thus ensuring, or at least increasing the chances, that the user input is accurately and efficiently handled.

A challenging functionality for chatbots is the ability to determine whether there exists (i.e., is available) a chatbot that is capable of handling a given user input or whether a particular chatbot is capable of handling a given user input. If such a chatbot exists, then the user input may be communicated to the chatbot for processing. In systems where there are multiple chatbots, it can be difficult at times to determine whether there is a particular chatbot among the multiple chatbots that is more suited to handling a given user input. For example, a chatbot, also referred to as a chatbot system, may include a finance bot and a retail bot, where the finance bot is configured to provide a user with information on the balance in the user's bank account, and where the retail bot is configured to provide the user with information on a gift card balance for a retail store. If a user provides user input represented by the input utterance "check balance," it is unclear which of the two bots the user wishes to invoke since both the finance bot and the retail bot are capable of providing balance information. In such a scenario, the user can be prompted for further input to disambiguate the user's intent. For example, the chatbot system may ask the user which of the two bots to use or of which account the user wants to check the balance.

One option for resolving a user's intent as expressed in an utterance to a particular chatbot is to employ a machine learning (ML)-based classifier. An ML-based classifier may, for example, be implemented using a neural network that has been trained on example utterances, also referred to as training utterances, where the example utterances are representative of tasks that a chatbot can perform. Each chatbot in a chatbot system may have associated with it a corresponding classifier that has been trained using example utterances specific to the chatbot. As an alternative or in addition to such classifiers, a rule-based classifier may be used. For example, in certain embodiments, a rule-based classifier is used in a chatbot system to identify another chatbot (e.g., to select the other chatbot form among multiple available chatbots) for handling a user input.

As discussed below, embodiments are described in which a rule-based classifier is configured to identify chatbots by matching utterances to templates. In certain embodiments, classification involves comparing an input utterance to a set of templates, where each template is a regular expression (regex) and is associated with a particular chatbot. A regex is a logical expression that specifies a string pattern. In certain embodiments, a regex includes pattern information plus linguistic part-of-speech (POS) information.

Techniques are also described for generating templates based on example utterances that have been provided for a chatbot. One of the challenges to generating a template is to construct the template in such a way that the template matches as many different utterances as possible while also ensuring that matching utterances are representative of the same intent. For example, if a training corpus included four example utterances representative of the task of checking the balance in a bank account (i.e., four difference ways to state a request for the task), a separate template could be generated for each of the four example utterances, where each template requires an exact match to its corresponding example utterance. Each of the templates may, for example, require that a user utterance include at least the same sequence of words as the example utterance to which the template corresponds in order to be deemed a match. Such templates would be very precise so that the chances of matching to a user utterance that is not representative of checking the balance in a bank account would be extremely low. However, requiring an exact match is sub-optimal because, despite being high precision, few user utterances would match such templates, resulting in low recall. Thus, the usefulness of exact-match templates is limited.

Conversely, if a template is too general, then there is a risk of matching to user utterances that are representative of a different intent. For instance, a template that only requires the phrase "Check balance" would match to "Check balance in savings account" as well as "Check balance on gift card." Determining how to appropriately construct a template, including determining what elements of the template should be made mandatory and determining what elements of the template can be made optional, is therefore non-trivial.

In certain embodiments, an initial set of templates is generated based on example utterances. This initial set of templates is then refined using template generalization techniques that can be performed at the word and/or sentence levels to generate a final set of templates for use at runtime, when the templates are matched against user utterances. The final set of templates may include one or more generalized templates that were derived from the initial set of templates and may also include the initial set of templates.

Overview of Example Chatbot System

FIG. 1 is a block diagram of an environment 100 incorporating a chatbot system according to certain embodiments. Environment 100 includes a digital assistant builder platform (DABP) 102 that enables users of DABP 102 to create and deploy digital assistants or chatbot systems. DABP 102 can be used to create one or more digital assistants (DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides the text as input to digital assistant 106. In some embodiments, a user utterance 110 can be in audio input or speech form, such as when a user says or speaks something that is provided as input to digital assistant 106. The utterances are typically in a language spoken by the user 108. When an utterance is in speech form, the speech input is converted to text form utterances in that particular language and the text utterances are then processed by digital assistant 106 as user utterances 110. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (using NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using natural language generation (NLG) techniques. Thus, the natural language processing (NLP) performed by a digital assistant can include a combination of NLU and NLG processing.

The NLU processing performed by a digital assistant, such as digital assistant 106, can include various NLU related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications (e.g., an instant messaging application), and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or provided using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102, e.g., through a user interface provided by DABP 102 for registering the skill bot with the digital assistant. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 includes a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistant developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 including a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 can provide a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 creates a skill bot from scratch using tools and services offered by DABP 102.

In certain embodiments, at a high level, creating or customizing a skill bot involves the following activities:

(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot Each of the above activities is briefly described below.

(1) Configuring settings for a new skill bot: Various settings may be configured for the skill bot. For example, a skill bot designer can specify one or more invocation names for the skill bot being created. These invocation names, which serve as identifiers for the skill bot, can then be used by users of a digital assistant to explicitly invoke the skill bot. For example, a user can include an invocation name in the user's utterance to explicitly invoke the corresponding skill bot.

(2) Configuring one or more intents and associated example utterances for the skill bot: The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance. In some instances, input utterances are provided to an intent analysis engine (e.g., a rules-based or machine-learning based classifier executed by the skill bot), which is configured to use the trained model to predict or infer an intent for the input utterance. The skill bot may then take one or more actions based upon the inferred intent.

(3) Configuring entities for one or more intents of the skill bot: In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities can be added to an intent. Using the banking skill bot example, an entity called Account_Type, which defines values called "checking" and "saving" may enable the skill bot to parse the user request and respond appropriately. In the above example, while the utterances resolve to the same intent, the value associated with the Account_Type entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an Account_Type entity may be defined by the skill bot designer that enables various banking transactions by checking the user input for keywords like checking, savings, and credit cards, etc.

(4) Training the skill bot: A skill bot is configured to receive user input in the form of utterances, parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. Q&A intents are created in a similar manner as regular intents. The dialog flow for Q&A intents can be different from that for regular intents. For example, unlike regular intents, the dialog flow for a Q&A intent may not involve prompts for soliciting additional information (e.g., the value for a particular entity) from the user.

(5) Creating a dialog flow for the skill bot: A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, and how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections, which are described below:
  (a) a context section
  (b) a default transitions section
  (c) a states section Context section: The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section: Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section: A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states section. For example, there might be times when it is desirable to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, the states section in the dialog flow definition of the first skill can be configured to initiate an interaction with the second different skill in the same digital assistant and then return to the original dialog flow.

(6) Adding custom components to the skill bot: As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot: DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the Exit and Help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, ML-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as an explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (using the trained model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Classification at Digital Assistant or Skill Bot Level

The template-based classification techniques described herein can be applied at the master bot/digital assistant level and/or at the skill bot level. For instance, in a chatbot system including a digital assistant or master bot, plus one or more skill bots, the template-based classification processing can be performed by a classifier of a master bot/digital assistant and/or by a classifier of a skill bot. For example, as depicted in FIG. 2, a master bot can include a classifier 224 which can be implemented using templates.

Figure 2:
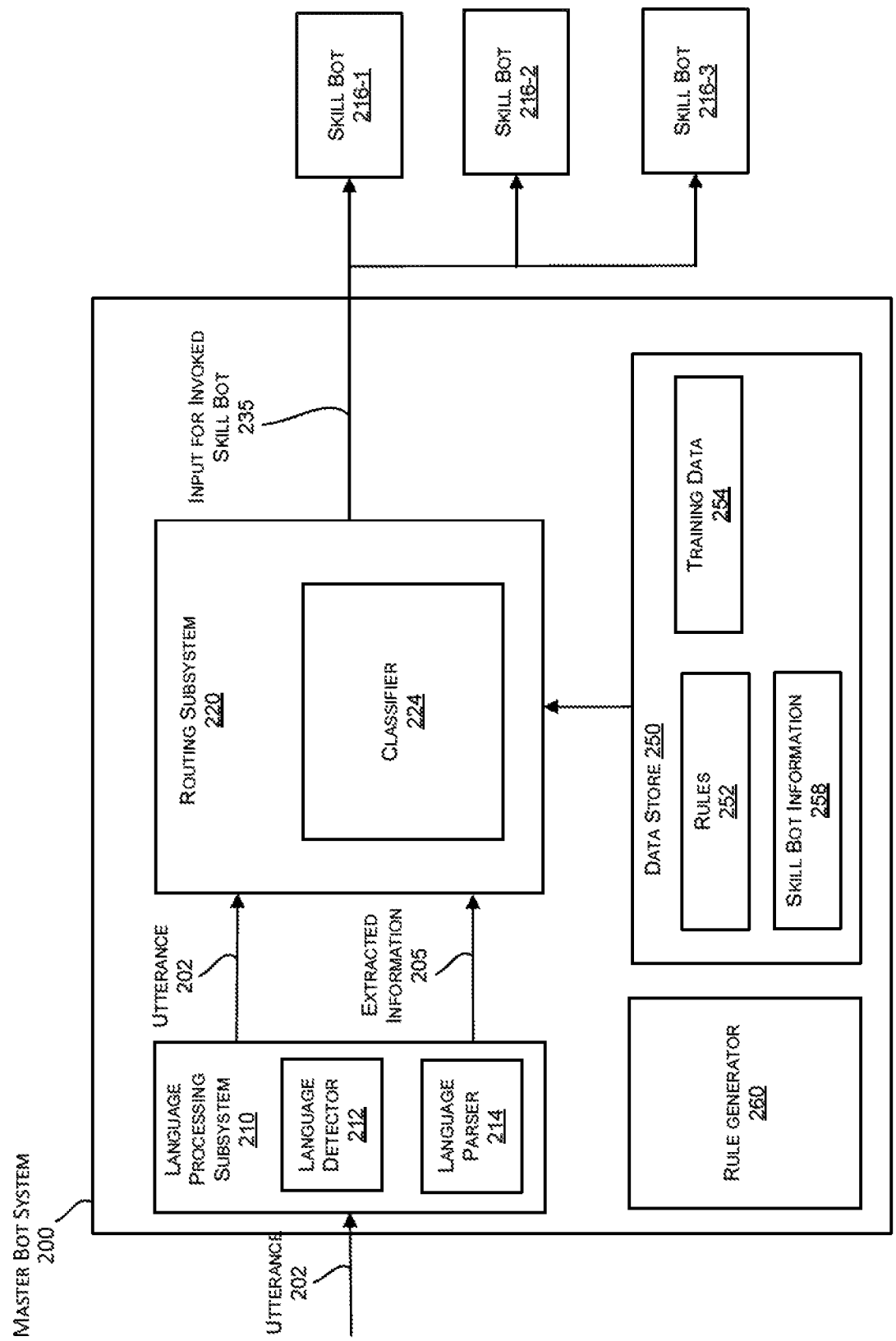
FIG. 2 is a simplified block diagram of a master bot system according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a routing subsystem 220, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Language processing subsystem 210 is configured to process an utterance 202 provided by a user. As discussed in the Chatbot System Overview section above, such processing can involve NLU processing performed to understand the meaning of an utterance. Accordingly, the language processing subsystem 210 may include a language detector 212 configured to detect the language of the utterance 202 and a language parser 214 configured to parse utterance 202 to understand its meaning. The processing performed by the language processing subsystem 210 can include, for example, sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). The language processing subsystem 210 outputs the utterance 202 together with extracted information 205 generated as a result of the above noted processing. For example, the extracted information 205 may include a dependency tree, a list of part-of-speech tags, and so on. In some embodiments, the language processing subsystem 210 may reformat the utterance 202 for input to the routing subsystem 220. Reformatting may involve, for example, rearranging the order of words in the utterance 202, splitting the utterance 202 into different parts for separate processing of each part, correcting grammatical errors, and the like.

Routing subsystem 220 is configured to determine which bot (e.g., one of a set of available skill bots 216-1 to 216-3 or the MB system 200 itself) should handle a user utterance (e.g., the utterance 202). In particular, the classifier 224 of the routing subsystem 220 is configured to determine whether a user utterance is representative of a particular bot (master or child/skill) and/or whether a user utterance is representative of a particular intent that has been configured for a particular bot. For example, as discussed earlier, a skill bot may be configured with one or more bot intents. Each bot intent can have its own dialog flow and be associated with one or more tasks that the skill bot can perform. Upon determining that the utterance 202 is representative of a particular bot or intent with which the particular bot has been configured, the routing subsystem 220 can invoke the particular bot and communicate the utterance 202, possibly together with the extracted information 205, as input 235 for the particular bot.

The classifier 224 can be implemented using a rule-based or ML-based model, or both. For instance, in some embodiments, the classifier 224 may include a neural network trained on training data 254. The training data 254 may include, for each skill bot 216, a corresponding set of example utterances (e.g., two or more example utterances for each intent with which the skill bot 216 is configured). The training data 254 may be used to pre-train the neural network to infer the likelihood that a user utterance is representative of the skill bot 216 or one of the intents that have been configured for the skill bot 216.

Additionally, in certain embodiments, the classifier 224 may be configured to apply a set of rules 252 to determine the likelihood that a user utterance is representative of a skill bot 216 or one of the intents that have been configured for the skill bot 216. A determination made as a result of applying a rule can be combined with a determination made using an ML model. For instance, the neural network of the classifier 224 may output a first confidence score, the results of applying a rule may include a second confidence score, and the classifier 224 may combine both confidences scores mathematically or compare the confidences scores to each other to determine which bot the utterance 202 most likely representative of.

The rules 252 can be implemented in various ways. For instance, a rule can be expressed as a logical statement that includes one or more conditions relating to the sentence structure of an utterance. In certain embodiments, the rules 252 are expressed as templates, more specifically, as regexes. As indicated above, a regex is a logical expression that specifies a string pattern. For instance, a regex for a pizza ordering bot may specify that, in order for an utterance to match to the pizza ordering bot, the utterance must contain the word "pizza" in combination with at least one word among a set of synonyms for placing an order (e.g., "order," "buy," "purchase," etc.).

The string pattern for a template can be derived from example utterances (e.g., the same utterances included in the training data 254). Examples of how such string patterns can be derived are described below. In general, the string pattern for a template is formed through iteratively refining a set of one or more example utterances to produce a more general form of example utterance(s). The refining may involve analyzing the syntax and structure of an example utterance (e.g., to identify linguistic parts-of-speech (POS), named entities, etc.). Thus, a string pattern may incorporate POS information so that the string pattern is formed by a sequence of words, where each word in the sequence of words corresponds to a particular part-of-speech (e.g., a noun, a pronoun, a verb, etc.).

The classifier 224 may calculate a confidence score for each template that is matched against a user utterance. This confidence score indicates the degree to which the user utterance matches the string pattern of a template. For example, if the utterance 202 matches a string pattern exactly, the classifier 224 may calculate a confidence score of "1" may be calculated. If the utterance 202 does not match (e.g., the utterance contains none of the words in the sequence specified in the string pattern), then the classifier 224 may calculate a confidence score of "0". The classifier 224 may assign the confidence score to the bot intent with which the template corresponds. If the confidence score for any particular bot intent exceeds a threshold, then the classifier 224 may deem the utterance 202 to be representative of that particular bot intent.

In some embodiments, the classifier 224 may support partial template matching. For example, the classifier 224 may calculate the confidence score for a template based on the percentage of the template that a user utterance matches to (e.g., a score between 0 and 1). Additionally, the classifier 224 may take the length of a template match into consideration, either as part of calculating a template score (e.g., weighting the template score by the number of words/elements matched) or in ranking template scores across different intents. For example, if templates corresponding to different intents have similar scores for the same user utterance, the classifier 224 may determine that the intent whose template has the longest match is the intent which is most likely represented by the user utterance.

Further, in certain embodiments, the classifier 224 may compute an overall confidence score for a bot based on individual scores for intents with which the bot has been configured (e.g., an average of all the template scores for a particular bot). If the overall score for a particular bot exceeds a threshold (which may or may not be the same as the threshold for a template score), then the classifier 224 may deem the utterance 202 to be representative of that particular bot.

As shown in FIG. 2, the rules 252 and the training data 254 can be stored in a data store 250 accessible to the MB system 200. The data store 250 can also store skill bot information 258. The skill bot information 258 can include information about the capabilities of the skill bots 216 configuration information for the skill bots 216. For example, the skill bot information 258 can include, for each skill bot 216, a list of bot intents and descriptions of tasks associated with those bot intents.

Templates can be used to perform matching at the sentence or utterance level. In some embodiments, the classifier 224 may also perform matching at the word level. For example, the rules 252 may include a list of words with associated confidence scores, where the confidence score of a word indicates the probability that the word represents a particular intent. Thus, the classifier 224 may be configured to determine a confidence score for each word in a user utterance by matching the words in the user utterance to words in the list. Word level scoring can be used in combination with template-based scoring to more accurately determine which bot intent a user utterance best represents. When a user utterance has a high score based on template matching, it is reasonably certain that the user utterance represents the intent to which the template corresponds. However, there may be instances where a user utterance is not a close match to any template, but nonetheless has a high word score (e.g., one or more words in the user utterance exceed a threshold).

After identifying a bot (e.g., based on evaluation of confidence scores generated as a result of matching against templates), the routing subsystem 220 may hand over processing of the utterance 202 to the identified bot. As part of this handover, the routing subsystem 220 may determine what to provide as input 235 for the identified bot. In some instances, the routing subsystem 220 may provide less than the entirety of the utterance 202 as the input 235. This may occur, for example, when the utterance 202 contains no information to be processed by the identified bot (e.g., the utterance 202 is simply intended to invoke the identified bot). Further, in some embodiments, the routing subsystem 220 may include at least some of the extracted information 205 in the input 235.

Figure 3:
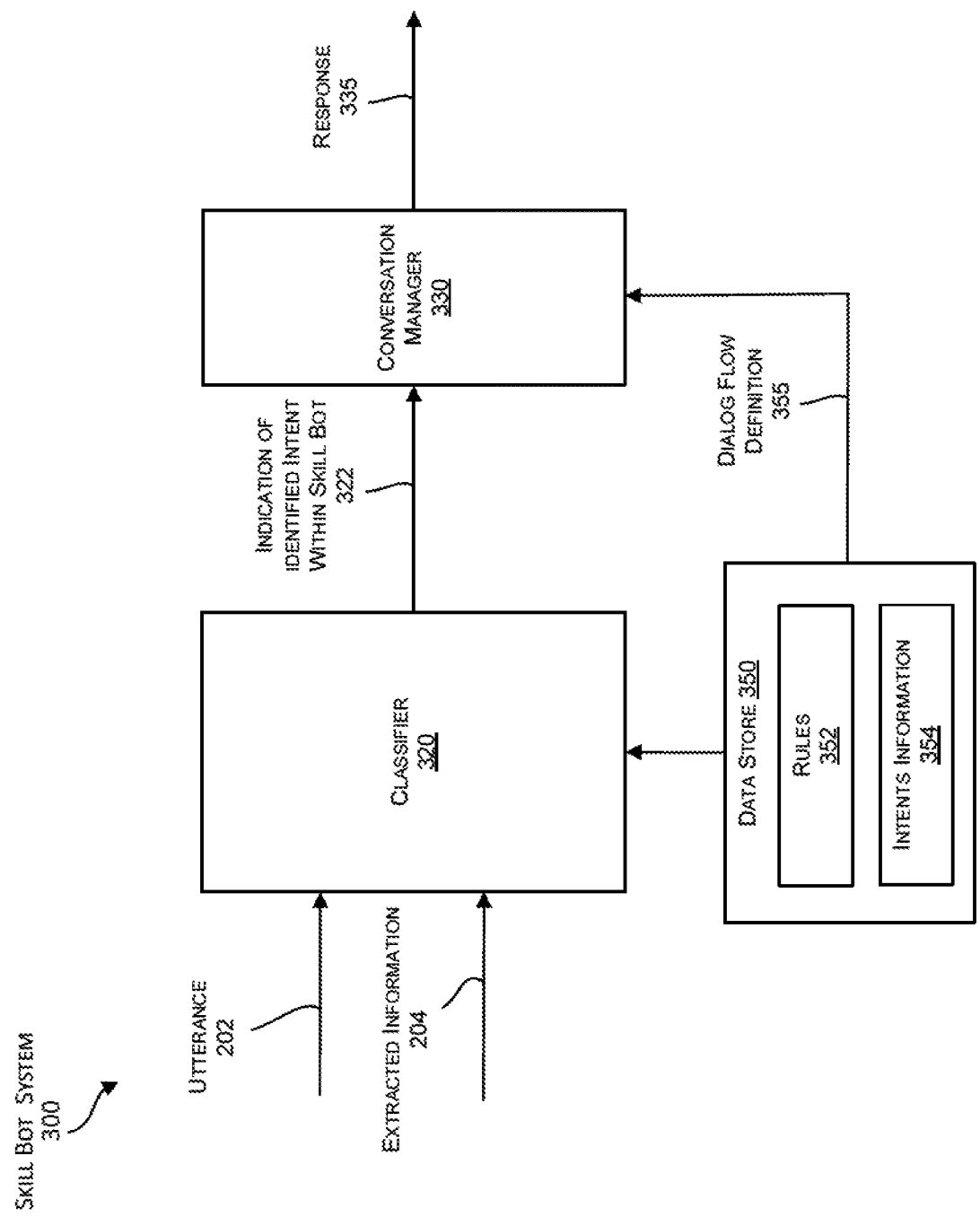
FIG. 3 is a simplified block diagram of a skill bot system according to certain embodiments.

FIG. 3 is a simplified block diagram of a skill bot system 300 according to certain embodiments. SB system 300 can implement any of the skill bots 216 in FIG. 2 and can be implemented in software only, hardware only, or a combination of hardware and software. As shown in FIG. 3, the SB system 300 can include a classifier 320 and a conversation manager 330.

Classifier 320 can operate in a similar manner to the classifier 224 in FIG. 2, and functionality described above with respect to the classifier 224 can be provided by the classifier 320. The classifier 320 can be implemented using a rules-based or ML-based model, or both, and can use the same input as the classifier 224 (e.g., the utterance 202 and the extracted information 205). In certain embodiments, the classifier 320 is configured to infer an intent for the utterance 202 by applying templates that are stored as rules 352 in a data store 350 accessible to the skill bot system 300. As shown in FIG. 3, the data store 350 can be configured to store rules 352 and intents information 354. The rules 352 may, for example, include a separate regex for each intent of the skill bot system 300. The intents information 354 may include example utterances from which the rules 352 are derived and/or other intent-related configuration information. For instance, the intents information 354 could include one or more confidence threshold values, where the values are specified by a skill bot designer as part of configuring the skill bot system 300.

The classifier 320 can determine, using the rules 352 and possibly also a trained AI model, whether the utterance 202 is representative of a particular intent with which a skill bot has been configured (i.e., one of the bot intents associated with the skill bot system 300). Each skill bot in a chatbot system may include its own classifier 320. Further, in some embodiments, the classifier 224 is configured to make its determination after a digital assistant/master bot has determined that the utterance 202 is representative of a particular skill bot. For instance, the master bot system 200 may determine, using the classifier 224, that the utterance 202 is representative of the skill bot corresponding to the skill bot system 300. Based on this determination, the master bot system 200 may provide the utterance 202 and the extracted information 204 as input to the classifier 320 so that the classifier 320 can match the utterance 202 against one or more templates to identify a bot intent that the utterance 202 best represents. In this manner, each skill bot can manage and apply its own templates that are derived from example utterances specific to the intents which have been configured for the skill bot.

Upon identifying an intent that the utterance 202 best represents, the classifier 320 may communicate an indication 322 of the identified intent to the conversation manager 330. In the embodiment of FIG. 3, the conversation manager 330 is shown as being local to the skill bot system 300. However, the conversation manager 330 can be shared between a master bot and multiple skill bots. Accordingly, in some embodiments, the conversation manager 330 is local to a digital assistant or master bot.

In response to receiving the indication 322, the conversation manager 330 may determine an appropriate response 335 to the utterance 202. For example, the response 335 may correspond to one of the DA responses 112 in the embodiment of FIG. 1 and could be an action or message specified in a dialog flow definition 355 configured for the skill bot system 300. For instance, the conversation manager 330 could access the dialog flow definition 355 from the data store 350 and determine, based on the dialog flow definition 355, a dialog flow state associated with the indicated intent as being the next state to transition to. The conversation manager 330 may determine the response 335 based on further processing of the utterance 202 and/or information derived from the utterance 202 (e.g., the extracted information 204). For example, if the utterance 202 is "Check balance in savings," then the conversation manager 330 may transition to a dialog flow state in which dialog relating to the user's savings account is presented to the user. The conversation manager 330 may transition to this state based on the indication 322 indicating that the identified intent is a "CheckBalance" intent configured for the skill bot system 300 and further based on recognizing that a value of "saving" has been extracted for an "Account_Type" entity.

Example Techniques for Generating Templates

One way to determine the extent to which a user utterance matches a template is to identify the longest common subsequence (LCS) that the user utterance has in common with the template. Based on the LCS, a confidence score can be calculated for an intent associated with the template. For example, the utterance "I want to order pizza" could be considered a 100% match to a template including the pattern "I order pizza" even though the utterance contains additional words. In certain embodiments, such a match returns a score of 1.0, which represents a perfect template match. This matching technique essentially tries to match at least a substring of the template and, ideally, the entire template. A user utterance can be matched against templates associated with different bot intents to classify the utterance as corresponding to whichever one of the different bot intents has a template with the highest score. As explained below, LCS can also be used to create a template that is representative of multiple example utterances.

Figure 4:
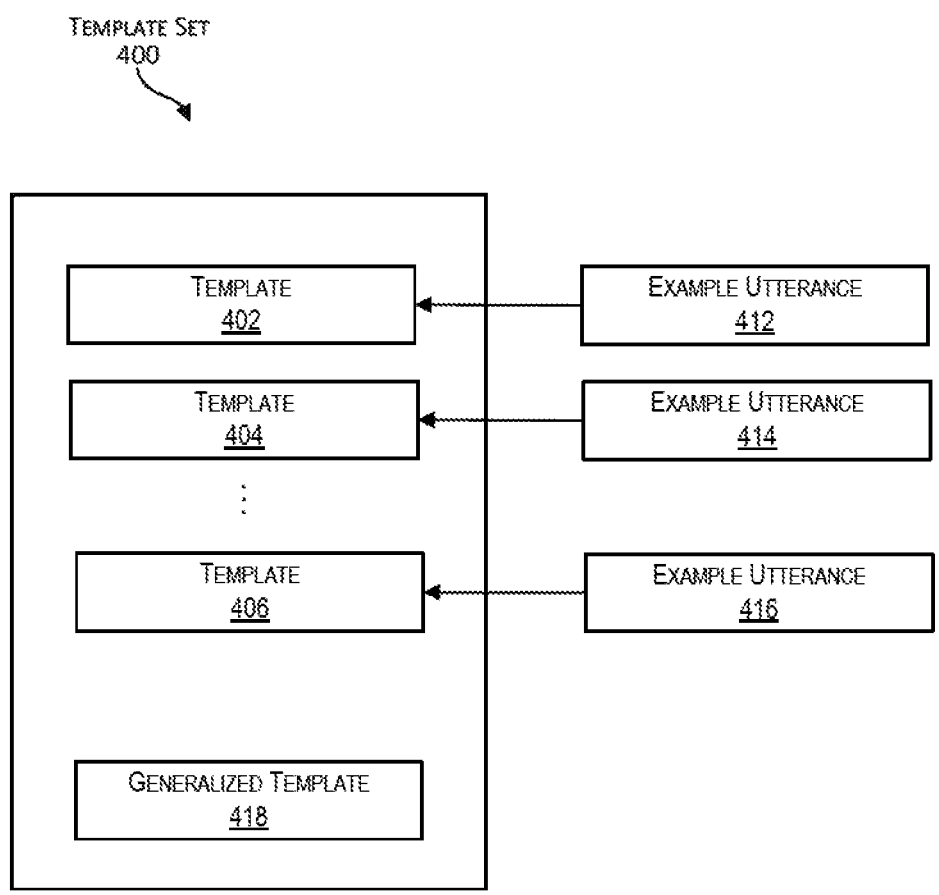
FIG. 4 illustrates an example template set in accordance with certain embodiments.

FIG. 4 illustrates an example template set 400 in accordance with certain embodiments. The template set 400 includes templates 402, 404, 406, and 418 and may correspond to templates that are associated with the same bot intent (e.g., an intent configured for the skill bot system 300 in FIG. 3). The templates 402, 404, and 406 are derived from example utterances 412, 414, and 416, respectively so that each example utterance has a corresponding template. For instance, the templates 402, 404, and 406 can be based on the exact string patterns of their corresponding example utterances 412, 414, and 416. In order to determine whether a user utterance is representative of the bot intent, the user utterance can be matched against each of the templates 402, 404, and 416. The results of the matching may include a confidence score for each template 402, 404, and 416, where the confidence score indicates the extent to which the user utterance is representative of the bot intent.

Creating and matching against a template for every example utterance provided for a chatbot (e.g., example utterances 412, 414, and 416) can be cumbersome. If there are variations or permutations of the same example utterance, separate templates may be generated for each permutation, and this would result in a large number of templates to match against. The number of templates can be reduced to a certain extent, e.g., by using an LCS-based induction process to identify a subsequence that is common to (shared between) two example utterances and using the subsequence as a template for both example utterances. For example, in the embodiment of FIG. 4, if the example utterance 412 and the example utterance 414 share the same subsequence, then the templates 402 and 404 could be replaced with a single template that captures this shared subsequence. However, templates derived solely through LCS-based induction fail to adequately capture the full breadth of the meaning behind the example utterances. For instance, merely identifying the longest common subsequence between an example utterance and another example utterance does not take into account which parts of the example utterances are optional to their meanings and which parts are mandatory.

Regexes provide a way to reduce the number of templates to be matched against while capturing the semantic meaning behind example utterances, to generalize them in a way that preserves the meaning of the example utterances. Additionally, regexes are advantageous because they are not only machine understandable, but also human understandable, which facilitates debugging and customization of rules by bot developers. In certain embodiments, a regex may include a pattern (e.g., a sequence of words/sub-strings and, for each word or substring, the number of required instances of that word or substring (0 or more, 1 or more, etc.). A regex may further include linguistic information (e.g., information regarding nouns, verbs, etc.). As an example, a regex may specify the order in which a particular word should appear in a user utterance in addition to the part-of-speech that the particular word functions as in the context of the user utterance.

Ideally, each intent configured for a chatbot has only one template generated for it, so that whether or not a user utterance is representative of the intent can be determined by matching against a single template. For example, as depicted in FIG. 4, a generalized template 418 can be generated which captures the structure and meaning of each of the example utterances 412, 414, and 416. A user utterance can be matched against the generalized template 418, and this may be sufficient for determining whether the user utterance is representative of the bot intent that is associated with the example utterances 412, 414, and 416. The user utterance may optionally be matched against the templates 402, 404, and 406 in order to determine which example utterance 412, 414, or 416 the user utterance is most similar to.

The generalized template 418 can be generated by applying linguistic understanding to reduce the templates 402, 404, and 406 into a more general form. The reduction process may involve generalizing the templates 402, 404, and 406 based on linguistic parts-of-speech such as nouns, subjects, predicates, etc. and relationships between such parts-of-speech. Examples of template generalization techniques applied at the word and sentence levels are described below.

In certain embodiments, templates are generated by a rule generator. The rule generator can be part of a digital assistant/master bot. For example, as depicted in FIG. 2, the master bot system 200 can include a rule generator 260. Alternatively, each skill bot (e.g., skill bot system 300 in FIG. 3) may include its own rule generator. In yet another embodiment, the rule generator can be part of a separate computer system external to a chatbot system. The rule generator can be implemented in hardware and/or software (e.g., as program code), and may be configured to perform linguistic processing to identify parts-of-speech in an example utterance, e.g., key nouns, verbs, and the like. The rule generator may further be configured to determine the sentence structure of an example utterance. Based on the linguistic processing, the rule generator may generate, as an initial set of templates (e.g., templates 402, 404, and 406), a separate regex for each example utterance.

After generating the initial set of templates, the rule generator may compare the templates to each other and, based on the comparison, identify patterns to learn rules which are encoded as one or more new regexes that supplement or replace the initial set of templates. The new regexes are generalizations (e.g., the generalized template 418) of the initial set of templates. For instance, a new regex may be determined which captures shared features of two or more previous regexes associated with the same intent. This can be done iteratively, one pair of regexes at a time. A new regex may also be a more general version of a previous regex. Thus, the generalized template 418 can be formed over the course of multiple iterations, where each iteration involves further refining or reducing at least one existing template.

Additionally, in certain embodiments, the rule generator is configured to perform a filtering procedure whereby if the same regex is associated with different bot intents, the regex is discarded because it is not specific enough (since matching such a regex would not be sufficient to indicate any particular bot intent of the different bot intents). For example, in the embodiment of FIG. 4, if during the process of generating the generalized template 418 a rule generator determines that there are two alternative ways to further reduce an existing template, but the first way results in a template identical to a generalized template that has been generated for a different bot intent (of the same chatbot or another chatbot), then the rule generator may disregard the template resulting from the first way. Thus, the rule generator may compare templates/regexes across intents to determine which regexes to keep.

To generate generalized templates, a rule generator such as the rule generator 260 in FIG. 2 may be configured to apply one or more heuristics. Generalizations can be performed at the word level, e.g., using stemming, system entity generalization, custom entity generalization, generalized parts of speech, word synonyms, and/or case neutralization.

Stemming: In stemming, words are replaced with their root/stem. For example, "paid" becomes "pay," so if a template includes the sequence "When was I last paid," the sequence becomes "When was I last pay."

System entity generalization: As indicated above, a chatbot system can be configured with system level entities, which are enumerated according to entity type. When such entities occur in a template sequence, they can be replaced with their named entity type. For example: "pay Lauren $20" may become "pay PERSON CURRENCY."

Custom entity generalization: As indicated above, a chatbot system can be configured with custom entities (e.g., an entity specific to one or more skill bots). When a custom entity is defined, a list of valid values may be specified for the custom entity. For example, an Account_Type entity may be a custom entity defined for a finance bot, where the Account_Type entity can have a value of "checking" or "saving." Thus, "pay Mom from checking" may become "pay Mom from Account_Type."

Generalized parts of speech: In some embodiments, certain parts of speech (e.g., symbols and interjections) are generalized. For example, "Hello $ % ^" may become "UH SYM SYM SYM," where "UH" denotes a greeting interjection and "SYM" denotes a symbol.

Word synonyms: Words can be replaced with their synonyms (e.g., synonyms from VerbNet, WordNet, or some other source of known synonyms). For example, "pay Mom $20" has the same meaning as "send Mom $20" since "send" and "pay" are synonyms. In this situation, "send" and "pay" can be included as options for the same template element, e.g., "(send pay) Mom $20." In some embodiments, synonyms are learned by encoding words from example utterances into word vectors and determining that word vectors are situated close to one another in vector space. For example, the word vectors for "red" and "green" may be located near each other in vector space because both these terms relate to the concept of color.

Case neutralization: In order to allow for variations in capitalization in user utterances, templates derived from example utterances can be standardized through case neutralization. For example "I want to order a Pizza" may become "i want to order a pizza."

In certain embodiments, a rule generator is configured to employ sentence level generalizations in conjunction with, or as an alternative to, word level generalizations. Sentence level generalizations can include, for example, stop words, induction, sub-expressions/linguistic group, sub-pattern ordering, optional sub-expressions, merging of sub-expressions, synonyms, language features, and language a priori sub-expressions.

Stop words: In some instances, stop words may be removed from a template. For example "I want to send money" may become "I want send money."

Induction: As indicated above, example utterances can be used to generalized based on their longest common subsequence. For example "I to send money" can be a generalization of "I want to send money for something" and "I would like to send money."

Sub-expressions/Linguistic grouping: Linguistic reasoning can be applied to group parts of an utterance together into sub-patterns. For example, "I want to send $20 from my checking account to Mom" can be broken up into the following sub-patterns:
Request type: I want to
Main verb: send
Direct object: $20
Preposition/entity phrase 1: from my checking
Preposition/entity phrase 2: to Mom
Verb, noun, and prepositional phrases appearing in sub-patterns can also be further broken down into their constituent parts. For example, a prepositional phrase can be divided into a preposition and then a noun phrase. Similarly, a noun phrase can be divided into an adjective, a pronoun, a determiner, and then a noun. For example, in the sentence "I am going to school," the words "going to" are part of a verb phrase and "school" is part of a noun phrase, so "going" and "to" should be grouped together separately from the noun phrase elements (e.g., school).

Linguistic grouping can also be performed across templates. For example, suppose there are two templates for the same intent. The two templates are of the form: A B E1 E2 (template 1) and A B E3 E4 (template 2), where E1, E2, E3, and E4 are entities. It can therefore be inferred that a more general form of both templates is: A B (E1 E2|E3 E4). As another example, suppose that the two templates are of the form: A B DO1 E1 and A B DO2 E2. The general form of both templates could therefore be: A B (DO1 E1|DO2 E2).

Sub-pattern ordering: Words which are grouped into sub-patterns can be ordered in different ways. For example "I want to send $20 from checking to Mom" could be reordered as "$20 to Mom from checking I want to send."

Optional sub-expressions: Sub-patterns can include optional and/or mandatory elements (e.g., A is optional, any of A or B, either A or B, etc.). For example "I want to send money to Mom" can be expressed in template form as: (I want to), send, money, (to Mom)*, so that "to Mom" is optional. Optional elements can be identified, for example, by comparing templates to determine which parts of the templates are redundant. For example, if two templates for the same intent are of the form: A B C (template 1) and AB CD (template 2), it can be inferred that element D is optional. In some instances, certain types of sub-patterns, such as prepositional phrases, may be deemed optional. Additionally, optional elements can be identified based on their part of speech. For example, verbs/actions and objects are usually mandatory, whereas entities are typically parameters of a request and can therefore be made optional. Adverbs are another example of elements that can be made optional.

Merging of sub-expressions: Sub-expressions that are equivalent in meaning can be merged by replacing them with a compound expression. For example, "(I would like to), send, money" and "(I want to), send, money" can be generalized as: (I (would like)|want to), send, money.

Synonyms: In some embodiments, a rule generator may be configured to learn synonyms across example utterances/templates. If templates resulting from two or more example utterances differ by only one word and the word is the same part of speech, the rule generator may recognize the differing words as being synonyms. For instance, a rule generator may determine that "send" and "pay" are synonyms based on "send Mom $20" and "pay Mom $20" being provided as example utterances for the same bot intent.

Language (semantic) features: In certain embodiments, a rule generator may generate templates with sub-expressions based on the presence or absence of semantic features. For instance, a generalized template may specify whether a sub-expression element is a negation or not, the verb tense for a sub-expression element, the quantity being requested, or the type of request.

Language A Priori Sub Expressions: In certain embodiments, a rule generator may be configured with sub-expressions or partial templates which are provided independent of any example utterances. Such sub-expressions can be based on common, language-dependent usages such as idioms. For example, in the English language, the following could be an a priori sub-expression:

please*, ((I want)|(I would like)|(could you)|(would you)|can you)*, (show|tell|help) me*, ?*

Thus, if the rule generator were to generate a generalized template based on example utterances that only include "I want to," the rule generator could incorporate the above sub-expression into the generalized template, thereby capturing variations of the same sub-expression even though such variations are not represented in the example utterances.

From the discussion above, it will be understood that generalization can involve other techniques besides LCS, such as generalization based on knowledge of entities and linguistic information such as synonyms and sub-pattern expressions. In certain embodiments, generalization is performed taking into consideration individual word scores. As mentioned earlier, a classifier may perform word level matching based on a list of words with corresponding confidence scores. Word scores can also be used to generalize templates. For example, a template can be made more general by eliminating words whose scores are below a certain threshold, making words whose scores are above a certain threshold mandatory, or both. Candidate templates can be rejected if they don't contain any individually high scoring words or consist entirely of stop words or stop phrases (help, show, can you help me to, etc.).

As indicated above, a classifier can employ templates derived using template generation and generalization techniques. Given a set of example utterances as training examples, a rule generator can use these example utterances as a starting point for generating a corresponding initial set of templates. In this manner, every training example can provide the basis for a corresponding template or rule. In order to match to user utterances that are not identical to the training examples, the initial set of templates can be generalized to produce one or more generalized templates, thereby allowing the classifier to match to a larger set of similar utterances. For example, as discussed above, templates corresponding to the same intent can be compared to generate a more general template based on the longest common subsequence. In order to arrive at a final generalized template (e.g., the generalized template 418), multiple candidate templates can be generated in this manner and then iteratively refined until the candidate templates can no longer be reduced without conflicting across bot intents. For instance, candidate templates across different intents (e.g., intents configured for the same skill bot or intents configured for different skill bots). If the same candidate template is generated for two different bot intents, then the candidate template can be eliminated from consideration as a template for both bot intents.

In certain embodiments, template generalization may involve backtracking or reverting to an earlier form of a candidate template (e.g., the immediately preceding form) in response to a determination that the current form of a candidate template conflicts with another template (e.g., a candidate template or a final generalized template) that is associated with a different bot intent. For instance, a rule generator may be configured to, upon detecting a conflict between a template for a first bot intent and a template for a second bot intent, undo the last generalizing step for at least one of the two templates. For example, upon reverting to the earlier forms of both templates, the rule generator can generalize the templates in different ways so that the templates do not conflict with each other. Further, the rule generator may store a record of any generalizing steps that cause conflicts, for example, by adding such generalizing steps to a blacklist. In certain embodiments, the rule generator maintains a separate blacklist for each bot intent. For added performance, the rule generator may be further configured to mark parts of candidate templates that cannot be generalized further without incurring a conflict as being "frozen," thereby indicating that the marked parts are in their final form.

Because generating a generalized template can involve numerous iterations, it can be computationally inefficient to perform processing to arrive at a "final" generalized template only to later discover that this generalized template conflicts with another template (e.g., during evaluation of a candidate template for another intent). Accordingly, in certain embodiments, a rule generator (e.g., the rule generator 260 or rule generators of different skill bots operating in cooperation with each other) is configured to perform generalizations for multiple intents in parallel. For instance, generalizations can be performed concurrently for all intents that have been configured within the chatbot system. This parallel processing may involve first performing more conservative or "safer" generalizations upon the initial templates for two or more configured intents, checking for conflicts among candidate templates after each generalizing step, and rolling back candidate templates if a conflict is discovered. Examples of conservative generalizations include stemming and system entity generalization, both of which can be performed with little to no risk of changing meaning or inadvertent removal of elements that are critical to meaning. After the conservative generalizations have been completed, the rule generator can progress to less conservation generalizations, and again, checking for conflicts after each generalizing step and reverting to earlier template forms when a conflict occurs.

Backtracking example: suppose that "How much did I spend last month" is an example utterance for a "Balances" intent and "How much did I spend on gas last month" is an example utterance for a "TrackSpending" intent. A rule generator may arrive at a generalizing step that makes "on gas" optional since this is a prepositional phrase. After making "on gas" optional, the rule generator determines that there is now a conflict between the current candidate template for the TrackSpending intent and the initial template for the Balances intent since the patterns for both templates are the same. In response to this determination, the rule generator can make "on gas" required again. Further, the rule generator may attempt to generalize "on gas" in a different way. For example, "on gas" could be generalized to an "ExpenseType" entity or grouped into a subexpression such as "on (gas|food|clothes)." If "on gas" cannot further generalized, then the rule generator may mark "on gas" as frozen and attempt a generalization on a different portion of the candidate template for the TrackSpending intent.

In certain embodiments, a rule generator may be configured to incorporate user input (e.g., input from a skill bot developer) as part of determining a final set of generalized templates. In particular, a rule generator may be configured to request user feedback on whether a generalizing step should be accepted or rejected. For example, as indicated above, a rule generator may generate synonyms based on the proximity of word vectors in a vector space. Proximity in vector space can indicate that words are closely related to each other (e.g., that the words have the same utility or meaning), but this is not always true. In some instances, words whose vectors are close in vector space are not synonyms. Accordingly, the rule generator could, after identifying words that are potentially synonyms, ask a user to confirm that the identified words are in fact synonyms. In this manner, machine learning (based on applying heuristics to training data) can be combined with human understanding to improve the quality of the resulting templates.

Template Generalization Example

Figure 5:
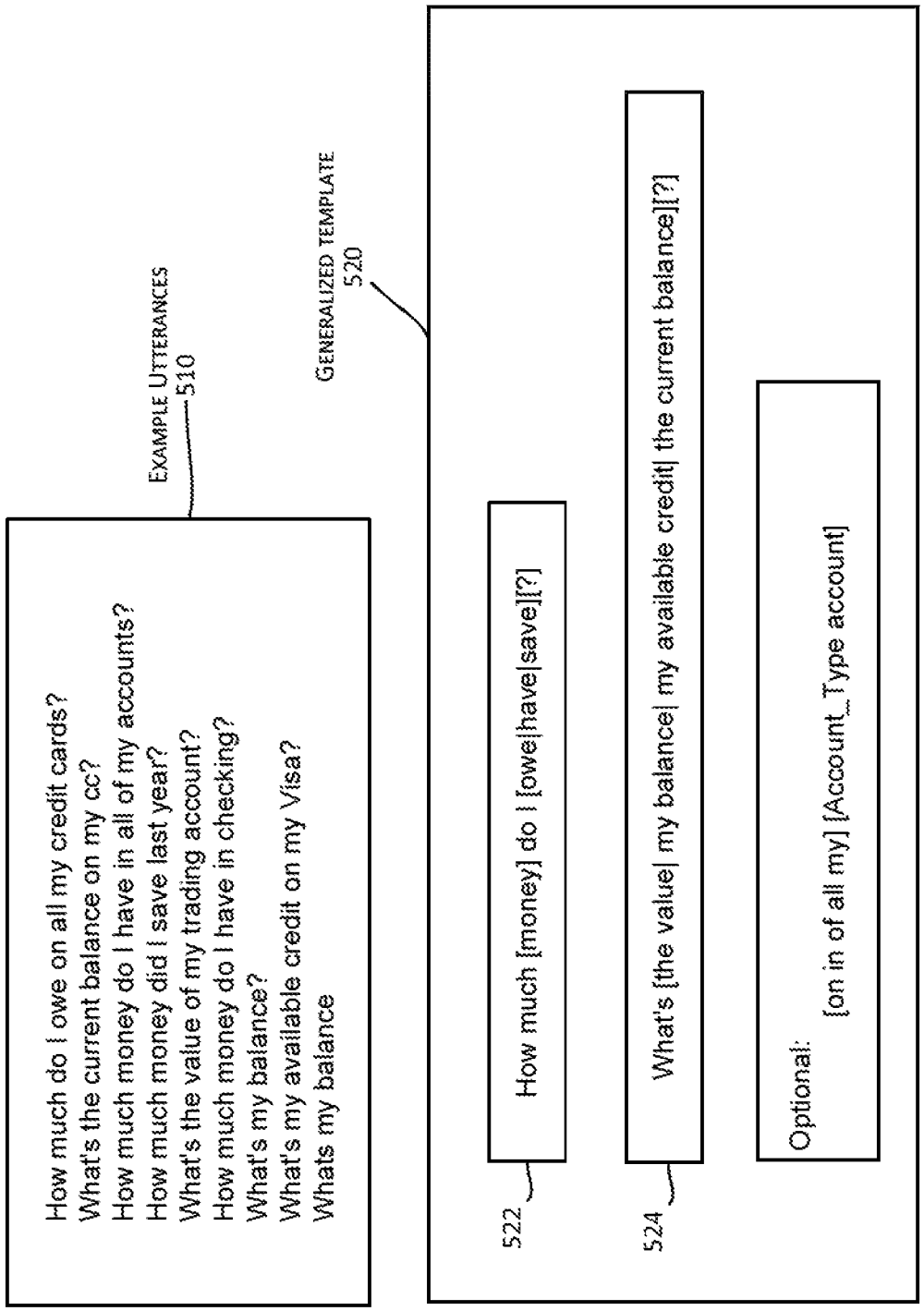
FIG. 5 illustrates example utterances and a generalized template according to certain embodiments.

FIG. 5 illustrates example utterances 510 and a generalized template 520 for a bot intent. In the embodiment of FIG. 5, the bot intent is associated with the task of checking balances in various banking accounts. As shown in FIG. 5, the example utterances 510 include the following:
How much do I owe on all my credit cards?
What's the current balance on my cc?
How much money do I have in all of my accounts?
How much money did I save last year?
What's the value of my trading account?
How much money do I have in checking?
What's my balance?
What's my available credit on my Visa?
Whats my balance As indicated above, entity generalization is among the more conservative types of generalizations. Accordingly, as an initial generalizing step, the following elements can be generalized to the "Account_Type" entity: credit cards, cc, trading, checking, Visa. This is shown in block 610 of FIG. 6.

Figure 6:
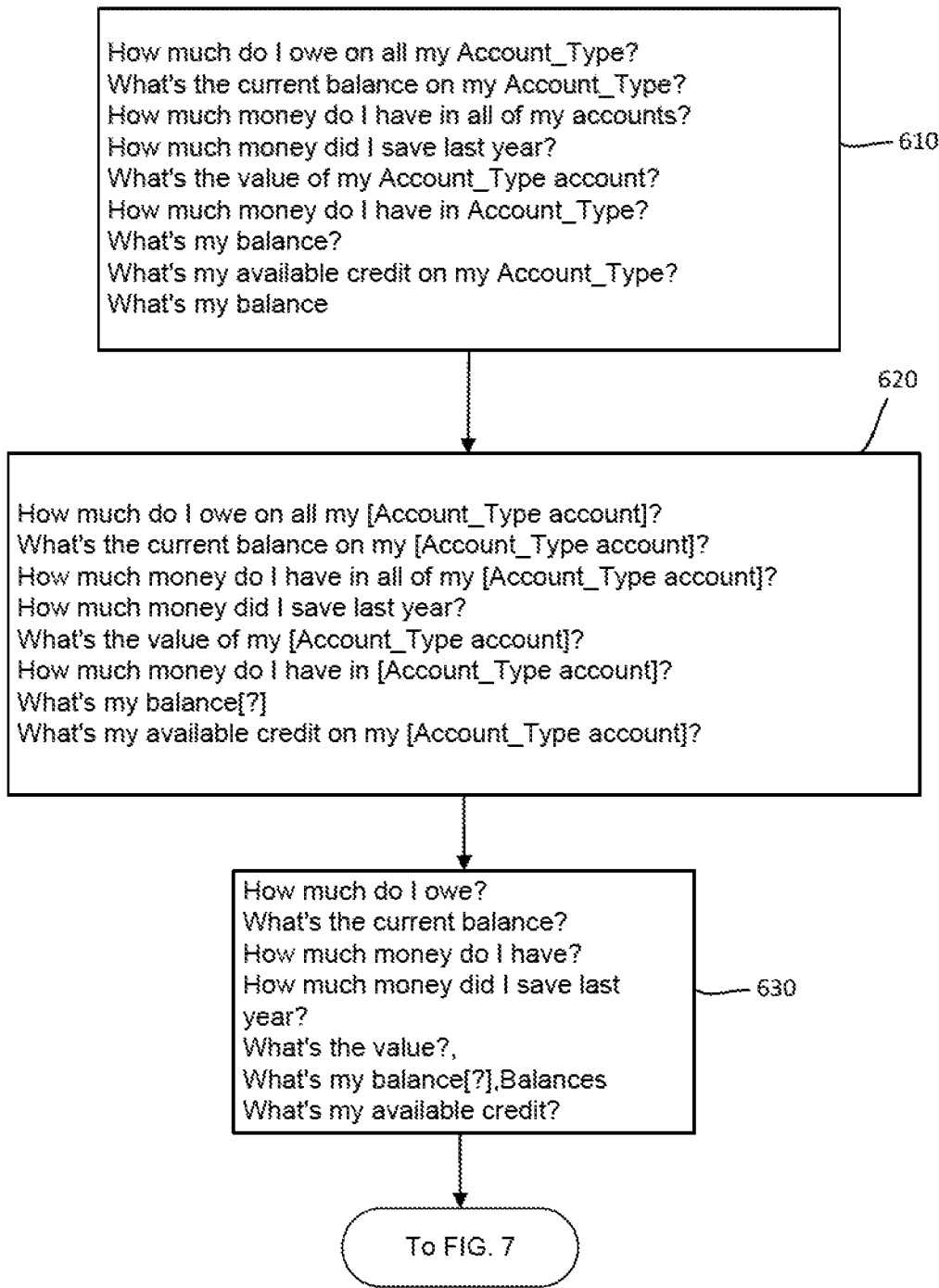
FIG. 6 illustrates the results of a sequence of generalizing steps based upon the example utterances in FIG. 5, according to certain embodiments.

FIG. 6 illustrates the results of a sequence of generalizing steps based upon the example utterances 510 in FIG. 5. Block 610 corresponds to the results of the initial generalizing step discussed above in connection with FIG. 5. As shown in FIG. 6, elements corresponding to the Account_Type entity have been replaced with "Account_Type". Additional processing that may be performed to produce the results shown in block 610 include correcting "Whats" into "What's".

Block 620 shows the results of further generalizations, including combining the phrases "What's my balance?" and "Whats my balance" into: "What's my balance[?]", where the brackets denote that the question mark is optional.

Block 620 also shows the results of a logical inference that a rule generator can make based on determining that there is an instance in which Account_Type is followed by the word "account". Based on this determination, the rule generator may infer that Account_Type can optionally be followed by "account" or that "account" could stand in place of Account_Type. This can be expressed as: [Account_Type account].

Block 630 shows the results of applying another logical inference. In particular, the rule generator may determine that, in the patterns produced thus far, Account_Type is often preceded by a preposition and/or qualifier such as "on all my", "on my", "in all of my", "of my", "in", and "on my". These phrases include a combination of prepositions, determiners, and possessive pronouns. Since the determiners are not important, these phrases can be rewritten as [on [all] my in [all of my]], or possibly [on in of all my]. So in the context of the Balances intent, the Account_Type entity can be expressed as the entity phrase: [on in of all my] [Account_Type account]. Since these are optional elements and the entity phrase can appear anywhere in the string pattern, either before or after other elements, the entity phrase is removed to produce the string patterns shown in block 630.

Figure 7:
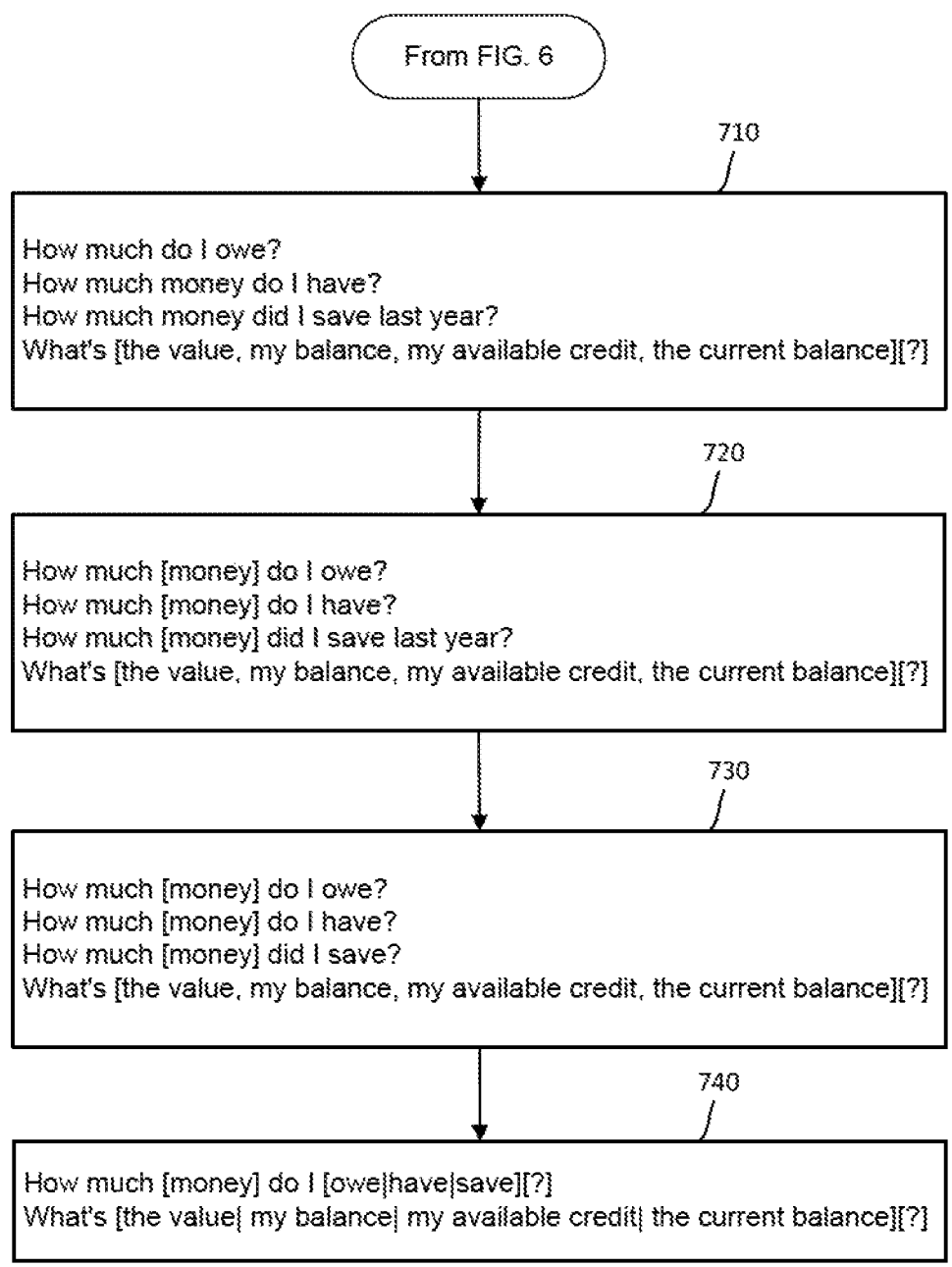
FIG. 7 illustrates the results of a sequence of generalizing steps that can follow the generalizations shown in FIG. 6, and which ultimately lead to the generalized template shown in FIG. 5, according to certain embodiments.

FIG. 7 illustrates the results of a sequence of generalizing steps that can follow the generalizations shown in FIG. 6, and which ultimately lead to the generalized template 520 shown in FIG. 5. As discussed above, in block 630, the entity phrase involving the Account_Type entity can be removed. However, it turns out that the removal detracts from the meaning somewhat, since the meanings of the parts that precede the prepositions (e.g., "What's the value") are now unclear.

As shown in block 710, the next logical inference can be based on recognizing that "the value", "my balance", "my available credit", and "the current balance" are phrases that preceded the entity phrase and were on the other side of the prepositions "in", "of", and "on". Thus, it can be inferred that these phrases are equivalent in meaning so that they can be combined as:
What's [the value, my balance, my available credit, the current balance][?]

Block 720 shows the result of inferring that "money" is optional. The rule generator could make this inference is different ways. One way is to recognize that "how much" is followed by a noun, "money", which is in turn followed by "do". Another way is to determine that "how much" should be followed perhaps by the noun or the thing being counted, but is omitted in some instances.

Block 730 shows the result of inferring that "last year" is an example of an entity that represents time. In this instance, entity is used to represent the relevant time period for which balance information is requested. Given that it is possible to provide the balance at times other than the present, such an entity may already have been declared (e.g., as a custom entity associated with the Balance intent). However, if no such entity has been declared, the rule generator may nevertheless assume that time is an entity associated with the Balance intent, and that any terms that correspond to the time entity can be omitted.

Block 740 shows the result of inferring that "owe", "have", and "save" are synonyms. If these terms were to appear in a synonym list such as VerbNet, they could be combined with other synonyms from the synonym list to create, as part of a template, a group of alternative terms. However, these terms ordinarily would not appear as synonyms in a synonym list. Instead, they are synonyms merely for the purposes of the Balance intent. Accordingly, the rule generator may infer that these terms are synonyms in another way. For instance, the rule generator may determine that the terms are synonyms based on the word vectors for each of these terms being located near each other in a vector space and/or based on user input confirming that these terms are in fact synonyms. Additionally, in block 740 the question mark "?" is made optional. Generalization processing can be repeated until no further reduction of templates can be made. For illustration purposes, it can be assumed that the final, irreducible form of the templates corresponds to the two string patterns shown in block 740.

The two string patterns shown in block 740 correspond to the generalized template 520 in FIG. 5. Referring back to FIG. 5, the generalized template 520 includes the two string patterns from block 740 as alternative string patterns 522 and 524. However, in some implementations, each final pattern may be treated as a standalone template. Additionally, the generalized template 520 includes the optional elements discussed above in connection with block 630 of FIG. 6.

FIGS. 5 to 7 are merely an example to illustrate how a sequence of generalizations can be performed to arrive at the final form of a generalized template. However, the final form need not be identical to the generalized template 520. Instead, modifications of the generalizing steps discussed above in connection with FIGS. 5 to 7 are possible. For instance, the processing depicted in block 740 of FIG. 7 could be followed by an additional step of determining that "what is" questions and "how much" questions are closely related for purposes of the Balances intent. A rule generator could make such a termination based on, for example, an ontology or knowledge graph.

As discussed earlier, a template can be expressed in the form of a regex that includes pattern information and linguistic part-of-speech (POS) information. Accordingly, although the discussion of FIGS. 5 to 7 was focused on derivation of the pattern information for the generalized template 520, it will be understood that the generalized template 520 can include more than just the two string patterns 522, 524 and the optional elements depicted in FIG. 5. For instance, the generalized template may include information on the parts of speech that different parts of the string patterns 522, 524 correspond to.

Example Training Process

Figure 8:
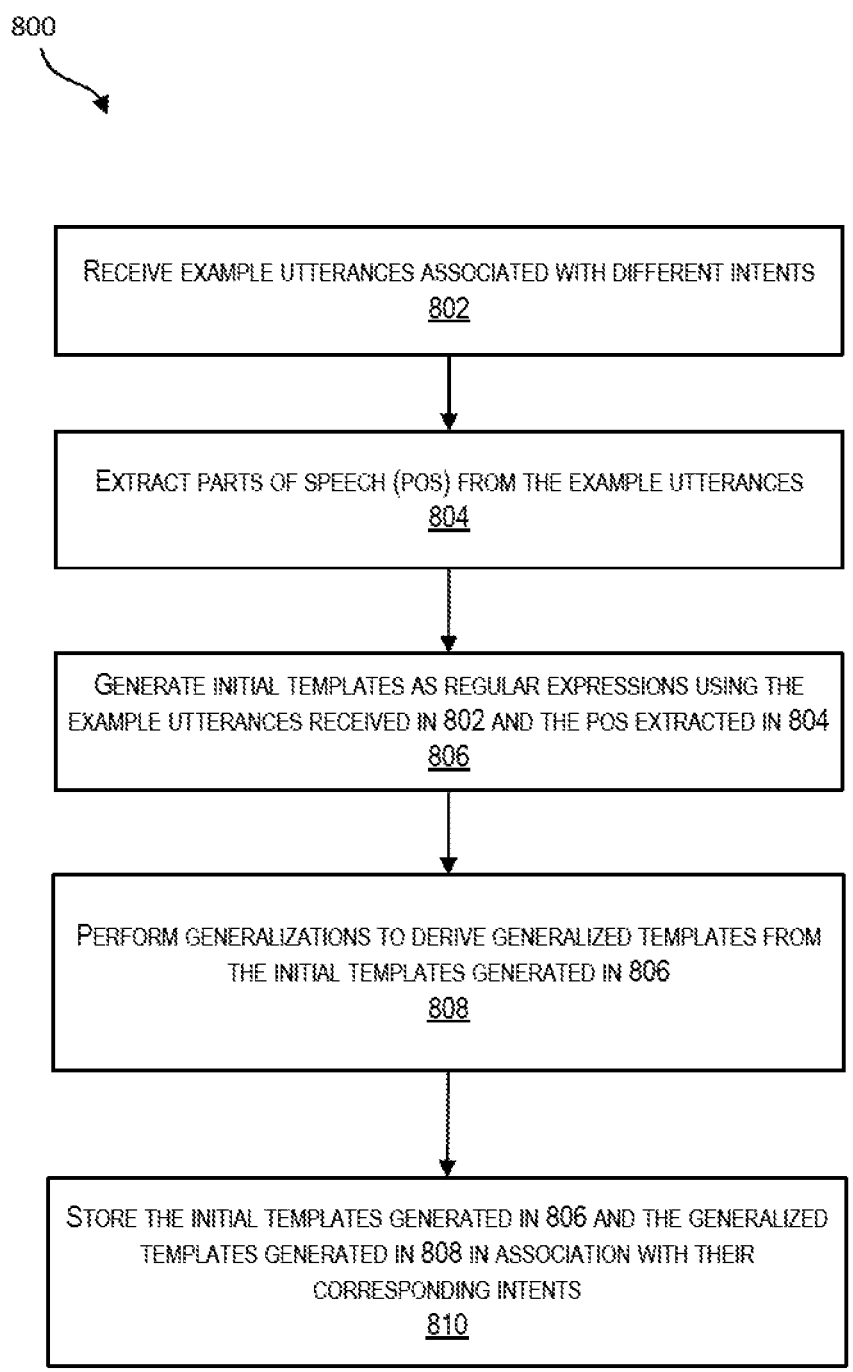
FIG. 8 illustrates a simplified flowchart depicting processing for generating a generalized template as part of training a classifier, according to certain embodiments.

FIG. 8 illustrates a simplified flowchart 800 depicting processing for generating a generalized template as part of training a classifier, according to certain embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 2, the processing depicted in FIG. 8 may be performed by a rule generator such as the rule generator 260.

At 802, example utterances associated with different intents are received. For instance, the chatbot system may include multiple skill bots, and one or more example utterances may be supplied for each of the skill bots. The example utterances can, for example, be utterances created by skill bot developers and stored for use as training data. In certain embodiments, each skill bot is trained independently. However, as indicated above, template generalization may involve performing generalizations for multiple chatbots in parallel. In some instances, the example utterances received in 802 may include utterances associated with different intents that have been configured for the same chatbot (e.g., a master bot or a skill bot). Further, in some instances, the example utterances received in 802 may include utterances associated with different intents that have been configured for different chatbots (e.g., utterances for a first skill bot and utterances for a second skill bot). Each intent may have certain declared entities/variables associated with it. For instance, a track spending intent may be configured with "Expense_Type" and "Amount" entities, among others. Additionally, there may exist certain system level entities that are not specific to any particular intent, for example, "Date" and "Time".

At 804, the parts of speech are extracted from the example utterances received in 802. For instance, each example utterance may be input to a language processing subsystem such as the language processing subsystem 210 in FIG. 2 to generate POS tags for the example utterances. The POS tags can be generated using a standard language parser and using universal parts-of-speech.

At 806, initial templates are generated as regexes using the example utterances received in 802 and the POS extracted in 804. Each template of the initial templates can be expressed as a regex that includes a string pattern. A regex may support the ability to specify, for the elements in its corresponding string pattern, the concepts of: any of/all of/one of, mandatory/optional, contiguous, ordered, and re-orderable. For instance, as explained earlier, regexes can be used to specify which elements are mandatory or optional and the order in which elements can appear in the string pattern. Further, each regex may include POS information. For example, a regex can include, for each POS in its string pattern, information indicating the corresponding POS tag (e.g., noun, verb, preposition, etc.).

At 808, generalizations are performed to derive generalized templates from the initial templates generated in 806. The generalizations in 808 can be performed using any of the word level and/or sentence level generalization techniques described above. For example, in certain embodiments, the generalizations in 808 may involve the following activities:

1) Using the declared entities for each intent, identifying entity phrases in order to generalize entities. For example, for a track spending intent, the utterance "how much I did I spend on entertainment" could be generalized as "how much did I spend on EXPENSE_TYPE".

2) Learning regex patterns for entity phrases, based on where the entity phrases appear in the example utterances and what are the common parts of speech for entity phrases associated with the same intent.

3) Learning prepositional phrase patterns. For instance, if one phrase had "on Expense_Type" and another had "for Expense_Type", the pattern "(on for) Expense_Type" could be learned. Learning may involve applying heuristics to make logical inferences based on linguistic understanding. Such inferences are aided by the POS extracted in 804.

4) Breaking utterances down into constituents, including verb phrases, "Wh" phrases (e.g., phrases including the word "what" or "which"), noun phrases, and prepositional phrases. Verb, wh, and noun phrase patterns are thereby learned.

5) Within a given intent, comparing utterances associated with that intent to learn how sub-phrase patterns can be merged (e.g., send and pay to "send pay"), or optionalized (e.g., a pattern for specifying a date range, "last month", may be learned to be optional). Additionally, synonyms can be learned, for example, based on words being used in the same context and/or from word vector similarity.

As discussed earlier, some types of generalizations are safer than others (e.g., stemming and entity generalization are generally among the safest), and such generalizations can be performed first as part of the processing in block 808. As also discussed above, if a generalization is tested and found to be invalid, backtracking (undoing a generalization) can be performed to try a different generalization instead, and generalizations which were banned/deemed invalid can be remembered so as not to reattempt the invalid generalization. Generalizations may be deemed invalid if they result in an overall pattern that: (i) is not specific enough (e.g. "what do" is a vague pattern that is unlikely to be specific to a particular intent), or (ii) matches a pattern of another learned generalization from a different intent.

The processing in block 808 (e.g., steps 3 to 5) can be repeated, pairing all combinations of remaining learned templates, until no further generalizations can be made. Additionally, user input (e.g., from a skill bot developer) can be used to test the validity of generalizations. For example, user input may be used as an alternative to comparing utterances in step 5 of block 808. Also, new training examples introduced via user input (e.g., additional example utterances supplied by a user) can cause training to begin again so that additional templates and generalizations derived from those additional templates can be generated.

At 810, the initial templates from 806 and the generalized templates from 808 are stored in association with their corresponding intents. For example, templates can be persisted in a storage memory (e.g., in a database) accessible to a runtime engine (e.g., the routing subsystem 220 in FIG. 2). The generalized templates form at least part of the rules to be applied by a classifier of the runtime engine (e.g., classifier 224).

Generalized templates generated according to the techniques described above (e.g., based on the processing discussed with respect to FIG. 8) have numerous advantages. For instance, by making certain template elements optional (e.g., based on the POS of the elements) instead of removing the elements entirely, generalization can be performed in a non-reductionist manner. In contrast, relying solely on LCS (a reductionist technique) to generalize templates could potentially result in templates that are too general. Further, new patterns can be learned from existing patterns to derived further generalizations (e.g., replacing a word with another word close in meaning based on Verb/WordNet or word vectors), thus improving the ability of the resulting templates to match to a greater range of user utterances. By testing candidate templates (e.g., through repeated rounds of pair-wise template comparisons across different intents), the precision with which the resulting templates represent their corresponding intents is improved.

Example Runtime Process (Intent Classification Based on Templates)

Figure 9:
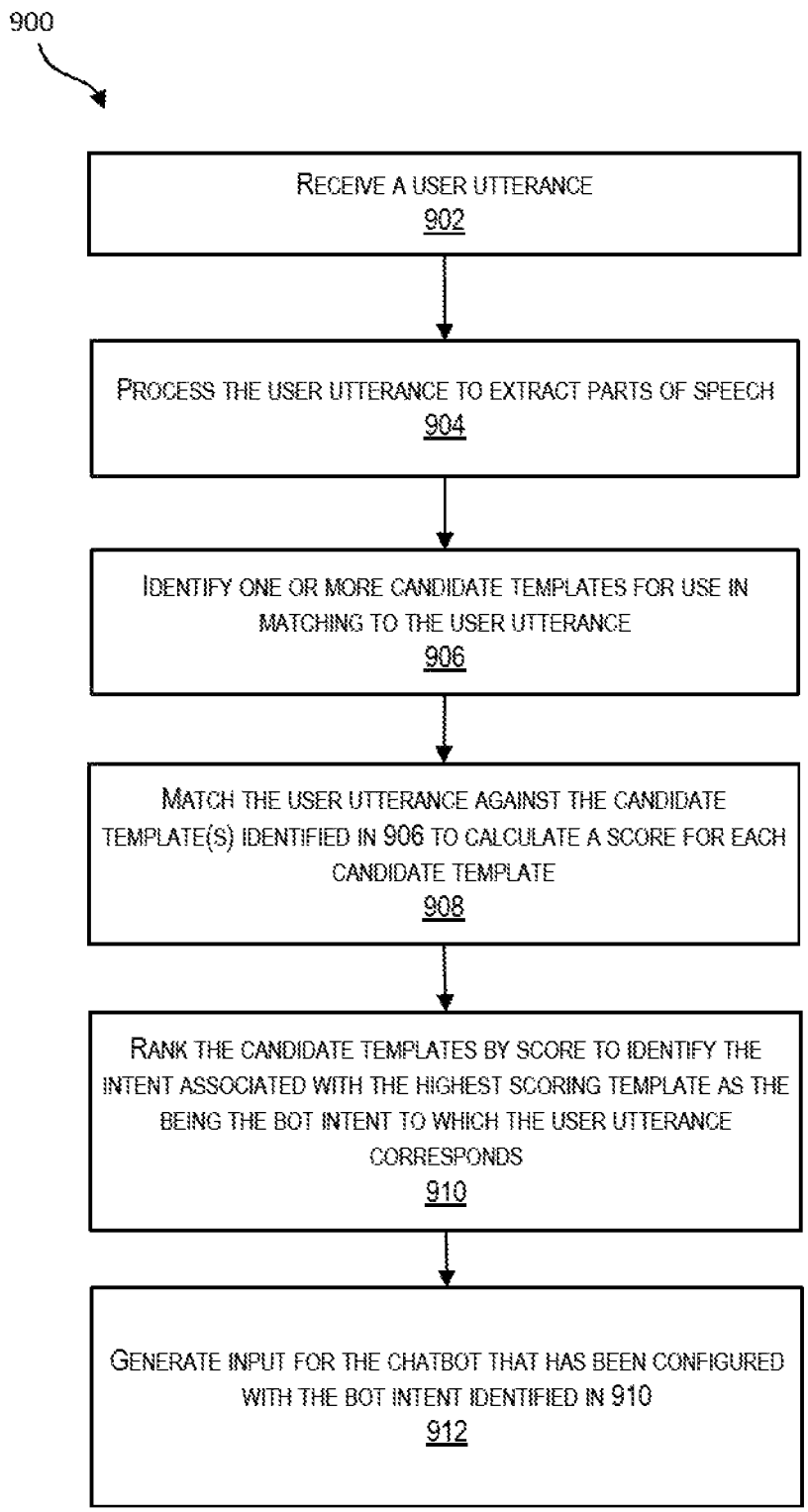
FIG. 9 illustrates a simplified flowchart depicting processing for classifying the intent of a user utterance based upon a generalized template, according to certain embodiments.

FIG. 9 illustrates a simplified flowchart 900 depicting processing for classifying the intent of a user utterance based upon a generalized template, according to certain embodiments. The processing depicted in FIG. 9 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 9 and described below is intended to be illustrative and non-limiting. Although FIG. 9 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 2, the processing depicted in FIG. 9 may be performed by a classifier such as the classifier 224.

At 902, an utterance is received from a user. For example, the utterance received in 902 may correspond to the utterance 202 in FIG. 2.

At 904, the utterance received in 902 is processed to extract parts of speech. The processing in 904 can be performed, for example, by a language parser such as the language parser 214.

At 906, one or more candidate templates are identified for use in matching to the utterance received in 902. In the context of intent classification, candidate templates can be a subset of all templates available to the classifier. Candidate templates include generalized templates and, in some instances, initial (non-generalized) templates. In some embodiments, the identification in 906 involves using an index to filter down the set of possibly matching templates. For example the index could be a "bag of words" type index of individual word scores. This bag of words type index may include, for each word in the index, an associated value indicating the probability that the word represents a certain bot intent. This allows a subset of bot intents to be quickly eliminated from consideration, along with templates associated with those intents, based on words scores for the utterance. In particular, the word scores can be used to identify intents that are most likely to be represented by the utterance and then select the templates associated with these identified intents as candidates for further evaluation.

At 908, the utterance received in 902 is matched against the templates identified in 906. As indicated above, templates can be expressed in the form of a regexes, which include a string pattern and, optionally, part of speech information. Accordingly, the matching in 908 may involve calculating a score for each candidate template based on the degree to which the utterance in 902 matches the string pattern and/or the part of speech information specified by the candidate template. For example, in some embodiments, the score is calculated such that: (i) if not all mandatory elements match, then the score is 0, and (ii) to get a perfect score of 1.0, all words in the user utterance must match to the candidate template, so that optional parts of candidate template's pattern are preserved. In other words, according to certain embodiments, a perfect score is achieved when the user utterance includes all the mandatory elements of a template plus all the optional elements of the template. However, other scoring methods are possible (e.g., calculating a score between 0 and 1.0 based on a partial match).

As part of the matching in 908, part of speech information can be applied to verify that the matching elements from the user utterance function as the same parts of speech as their corresponding template elements. If a word in the user utterance is the same as another word in a template, but has a different part of speech associated with it (e.g., one is a noun and the other is an adjective), the word in the user utterance can be deemed not a match.

At 910, the candidate templates are ranked by score to identify the intent associated with the highest scoring template as being the bot intent to which the user utterance corresponds, i.e., the intent that the user utterance best represents. In some embodiments, a threshold criterion may be applied such that the highest score must exceed the second highest score by a threshold. If the highest score does not exceed the second highest score by the threshold, then the classifier may prompt the user for input indicating which of the intents associated with the highest scoring templates is the intent that the user wishes to proceed with. For example, the classifier may present the user with a list of intents and ask the user to select from among the list. Alternatively, in the case of a partial template match yielding the highest score, or in the case of two high scoring template matches, the classifier could formulate a question about a word that is unknown to the training model (not represented in any template) and preventing a complete or unambiguous match. The question can be formulated so as to prompt the user to clarify the meaning of the word as it appears in the user utterance.

At 912, input is generated for the chatbot that has been configured with the bot intent identified in 910. For example, the input generated in 912 may correspond to the input 235 in FIG. 2 and can include the entirety of the user utterance. Alternatively, as described earlier, the input to a chatbot may include only part of a user utterance and/or extracted information. Examples of extracted information include POS tags and entity values (e.g., a value of "checking" for an Account Type entity). In some embodiments, the input generated in 912 includes the parsed form of the user utterance, with the user utterance being broken down into its constituent parts. Further, in some embodiments, the input generated in 912 may include an indication of which template was deemed the matching template (e.g., by virtue of having the highest score). Such additional information can be used by the chatbot receiving the information to perform specific actions. For example, the chatbot may, based on its dialog configuration, determine a response that depends on which template matched, such as starting a conversation in a different dialog flow state depending on the matching template.

The classification related processing depicted in FIG. 9 is not limited to being used for identifying intents configured for skill bots. System level intents (e.g., Exit, Help, or other intents configured for a master bot/digital assistant) can also be identified. In some embodiments, user utterances relating to system level intents are prioritized such that if the highest scoring template is associated with a system level intent and the user is currently engaged in conversation with a skill bot, the digital assistant interrupts the conversation to trigger a conversation between the user and the digital assistant. Upon completion of the conversation between the user and the digital assistant, the digital assistant may allow the user to switch back to the conversation that was interrupted.

Example Implementation

Figure 10:
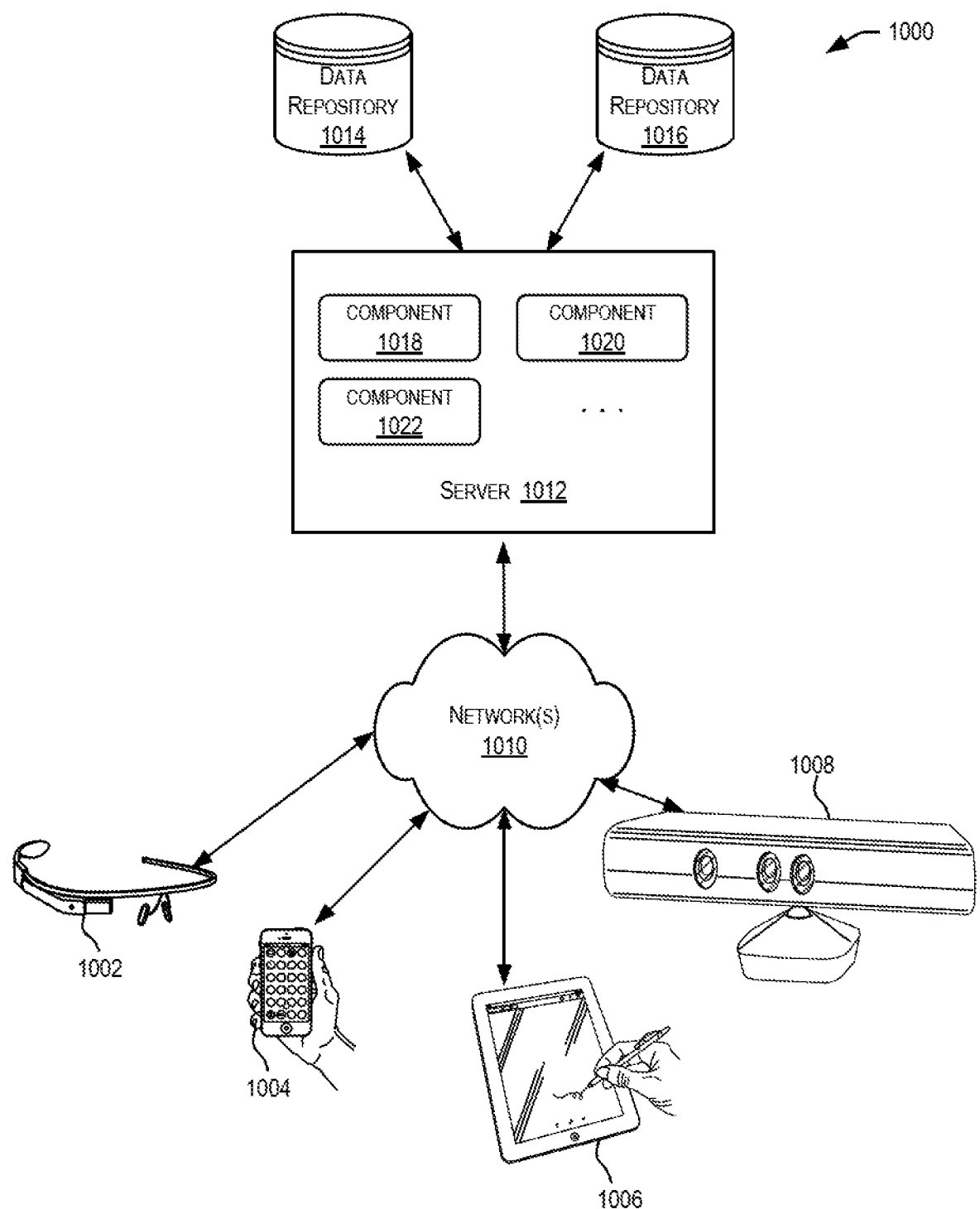
FIG. 10 depicts a simplified diagram of a distributed system for implementing an embodiment.

FIG. 10 depicts a simplified diagram of a distributed system 1000 for implementing an embodiment. In the illustrated embodiment, distributed system 1000 includes one or more client computing devices 1002, 1004, 1006, and 1008, coupled to a server 1012 via one or more communication networks 1010. Clients computing devices 1002, 1004, 1006, and 1008 may be configured to execute one or more applications.

In various embodiments, server 1012 may be adapted to run one or more services or software applications that enable templates to be generated for use in matching to user utterances.

In certain embodiments, server 1012 may also provide other services or software applications that can include non-virtual and virtual environments. In some embodiments, these services may be offered as web-based or cloud services, such as under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, server 1012 may include one or more components 1018, 1020 and 1022 that implement the functions performed by server 1012. These components may include software components that may be executed by one or more processors, hardware components, or combinations thereof. It should be appreciated that various different system configurations are possible, which may be different from distributed system 1000. The embodiment shown in FIG. 10 is thus one example of a distributed system for implementing an embodiment system and is not intended to be limiting.

Users may use client computing devices 1002, 1004, 1006, and/or 1008 to interact with a chatbot system. Users of client computing devices 1002, 1004, 1006, and/or 1008 can include end users who supply utterances during conversations with the chatbot system. Users of client computing devices 1002, 1004, 1006, and/or 1008 can also include users who provide input for generating templates as part of training an intent classifier in accordance with the teachings of this disclosure. A client device may provide an interface that enables a user of the client device to interact with the client device. The client device may also output information to the user via this interface. Although FIG. 10 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1010 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1010 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the IEEE 802.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 can include one or more virtual machines running virtual operating systems, or other computing architectures involving virtualization such as one or more flexible pools of logical storage devices that can be virtualized to maintain virtual storage devices for the server. In various embodiments, server 1012 may be adapted to run one or more services or software applications that provide the functionality described in the foregoing disclosure.

The computing systems in server 1012 may run one or more operating systems including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more data repositories 1014, 1016. These data repositories may be used to store data and other information in certain embodiments. For example, one or more of the data repositories 1014, 1016 may be used to store templates and/or other information used during intent classification. Data repositories 1014, 1016 may reside in a variety of locations. For example, a data repository used by server 1012 may be local to server 1012 or may be remote from server 1012 and in communication with server 1012 via a network-based or dedicated connection. Data repositories 1014, 1016 may be of different types. In certain embodiments, a data repository used by server 1012 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 1014, 1016 may also be used by applications to store application data. The data repositories used by applications may be of different types such as, for example, a key-value store repository, an object store repository, or a general storage repository supported by a file system.

Figure 11:
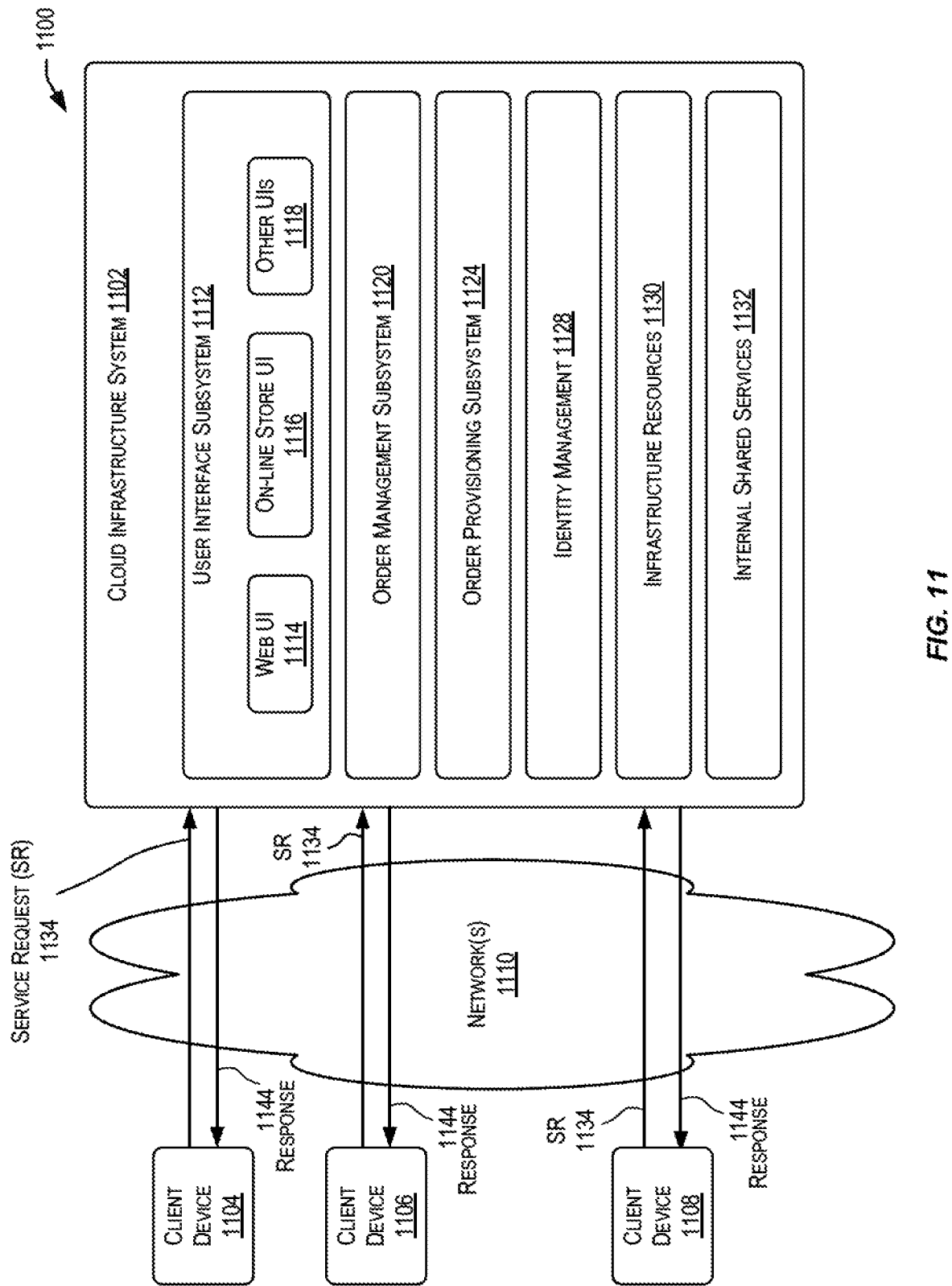
FIG. 11 is a simplified block diagram of a cloud-based system environment offering cloud services, in accordance with certain embodiments.

In certain embodiments, the classification-related functionalities described in this disclosure may be offered as services via a cloud environment. FIG. 11 is a simplified block diagram of a cloud-based system environment in which various classification-related services may be offered as cloud services, in accordance with certain embodiments. In the embodiment depicted in FIG. 11, cloud infrastructure system 1102 may provide one or more cloud services that may be requested by users using one or more client computing devices 1104, 1106, and 1108. Cloud infrastructure system 1102 may comprise one or more computers and/or servers that may include those described above for server 1012. The computers in cloud infrastructure system 1102 may be organized as general purpose computers, specialized server computers, server farms, server clusters, or any other appropriate arrangement and/or combination.

Network(s) 1110 may facilitate communication and exchange of data between clients 1104, 1106, and 1108 and cloud infrastructure system 1102. Network(s) 1110 may include one or more networks. The networks may be of the same or different types. Network(s) 1110 may support one or more communication protocols, including wired and/or wireless protocols, for facilitating the communications.

The embodiment depicted in FIG. 11 is only one example of a cloud infrastructure system and is not intended to be limiting. It should be appreciated that, in some other embodiments, cloud infrastructure system 1102 may have more or fewer components than those depicted in FIG. 11, may combine two or more components, or may have a different configuration or arrangement of components. For example, although FIG. 11 depicts three client computing devices, any number of client computing devices may be supported in alternative embodiments.

The term cloud service is generally used to refer to a service that is made available to users on demand and via a communication network such as the Internet by systems (e.g., cloud infrastructure system 1102) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 1102 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1102 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1102. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure. For example, a customer, via a subscription order, may order one or more services provided by cloud infrastructure system 1102. Cloud infrastructure system 1102 then performs processing to provide the services requested in the customer's subscription order. For example, a customer may place a subscription order for deploying a skill bot in a chatbot system. As part of configuring the skill bot, the customer may supply one or more example utterances for generating templates associated with intents that have been configured for the skill bot. Cloud infrastructure system 1102 may be configured to provide one or even multiple cloud services.

Cloud infrastructure system 1102 may provide the cloud services via different deployment models. In a public cloud model, cloud infrastructure system 1102 may be owned by a third party cloud services provider and the cloud services are offered to any general public customer, where the customer can be an individual or an enterprise. In certain other embodiments, under a private cloud model, cloud infrastructure system 1102 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1102 and the services provided may be shared by several organizations in a related community. Various other models such as hybrids of the above mentioned models may also be used.

Client computing devices 1104, 1106, and 1108 may be of different types (such as devices 1002, 1004, 1006, and 1008 depicted in FIG. 10) and may be capable of operating one or more client applications. A user may use a client device to interact with cloud infrastructure system 1102, such as to request a service provided by cloud infrastructure system 1102. For example, a user may use a client device to request a classification-related service described in this disclosure.

In some embodiments, the processing performed by cloud infrastructure system 1102 for providing classification-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 11, cloud infrastructure system 1102 may include infrastructure resources 1130 that are utilized for facilitating the provision of various cloud services offered by cloud infrastructure system 1102. Infrastructure resources 1130 may include, for example, processing resources, storage or memory resources, networking resources, and the like.

In certain embodiments, to facilitate efficient provisioning of these resources for supporting the various cloud services provided by cloud infrastructure system 1102 for different customers, the resources may be bundled into sets of resources or resource modules (also referred to as "pods"). Each resource module or pod may comprise a pre-integrated and optimized combination of resources of one or more types. In certain embodiments, different pods may be preprovisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1102 may itself internally use services 1132 that are shared by different components of cloud infrastructure system 1102 and which facilitate the provisioning of services by cloud infrastructure system 1102. These internal shared services may include, without limitation, a security and identity service, an integration service, an enterprise repository service, an enterprise manager service, a virus scanning and white list service, a high availability, backup and recovery service, a service for enabling cloud support, an email service, a notification service, a file transfer service, and the like.

Cloud infrastructure system 1102 may comprise multiple subsystems. These subsystems may be implemented in software, or hardware, or combinations thereof. As depicted in FIG. 11, the subsystems may include a user interface subsystem 1112 that enables users or customers of cloud infrastructure system 1102 to interact with cloud infrastructure system 1102. User interface subsystem 1112 may include various different interfaces such as a web interface 1114, an online store interface 1116 where cloud services provided by cloud infrastructure system 1102 are advertised and are purchasable by a consumer, and other interfaces 1118. For example, a customer may, using a client device, request (service request 1134) one or more services provided by cloud infrastructure system 1102 using one or more of interfaces 1114, 1116, and 1118. For example, a customer may access the online store, browse cloud services offered by cloud infrastructure system 1102, and place a subscription order for one or more services offered by cloud infrastructure system 1102 that the customer wishes to subscribe to. The service request may include information identifying the customer and one or more services that the customer desires to subscribe to. For example, a customer may place a subscription order for a classification-related service offered by cloud infrastructure system 1102. As part of the order, the customer may provide information identifying a particular chatbot and/or a particular intent configured for a chatbot. The customer may further provide example utterances for training a classifier to infer that a user utterance corresponds to the particular chatbot and/or the particular intent.

In certain embodiments, such as the embodiment depicted in FIG. 11, cloud infrastructure system 1102 may comprise an order management subsystem (OMS) 1120 that is configured to process the new order. As part of this processing, OMS 1120 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1120 may then invoke the order provisioning subsystem (OPS) 1124 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1124 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 1102 may send a response or notification 1144 to the requesting customer to indicate when the requested service is now ready for use. In some instances, information (e.g., a link) may be sent to the customer that enables the customer to start using and availing the benefits of the requested services. In certain embodiments, for a customer requesting the classification-related service, the response may include a final set of templates which have been generated (e.g., generalized templates) from a set of example utterances.

Cloud infrastructure system 1102 may provide services to multiple customers. For each customer, cloud infrastructure system 1102 is responsible for managing information related to one or more subscription orders received from the customer, maintaining customer data related to the orders, and providing the requested services to the customer. Cloud infrastructure system 1102 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1102 may provide services to multiple customers in parallel. Cloud infrastructure system 1102 may store information for these customers, including possibly proprietary information. In certain embodiments, cloud infrastructure system 1102 comprises an identity management subsystem (IMS) 1128 that is configured to manage customers information and provide the separation of the managed information such that information related to one customer is not accessible by another customer. IMS 1128 may be configured to provide various security-related services such as identity services, such as information access management, authentication and authorization services, services for managing customer identities and roles and related capabilities, and the like.

Figure 12:
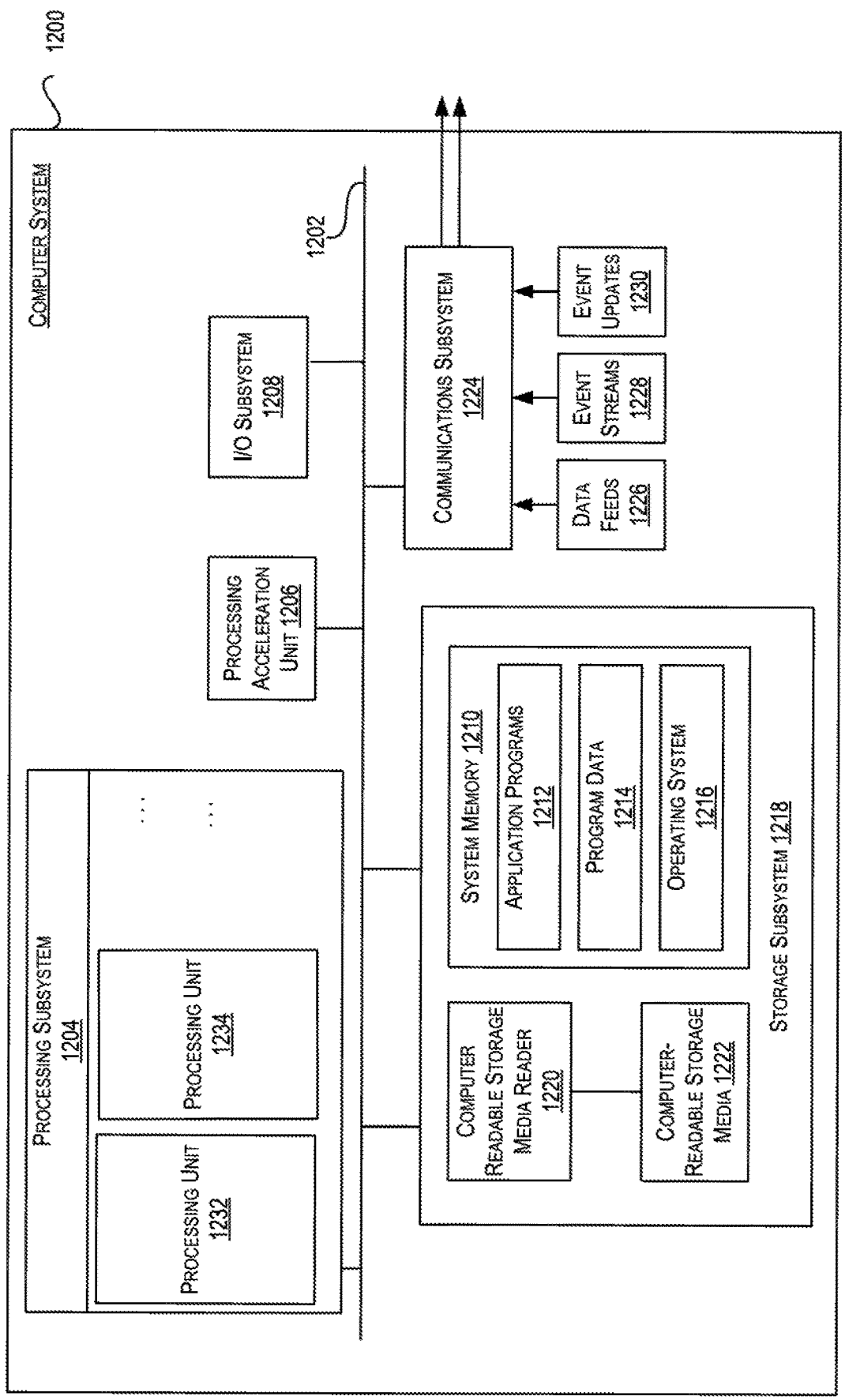
FIG. 12 illustrates an exemplary computer system that may be used to implement certain embodiments.

FIG. 12 illustrates an exemplary computer system 1200 that may be used to implement certain embodiments. For example, in some embodiments, computer system 1200 may be used to implement any of the master bot system 200, the skill bot system 300, and various servers and computer systems described above. As shown in FIG. 12, computer system 1200 includes various subsystems including a processing subsystem 1204 that communicates with a number of other subsystems via a bus subsystem 1202. These other subsystems may include a processing acceleration unit 1206, an I/O subsystem 1208, a storage subsystem 1218, and a communications subsystem 1224. Storage subsystem 1218 may include non-transitory computer-readable storage media including storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1204 controls the operation of computer system 1200 and may comprise one or more processors, application specific integrated circuits (ASICs), or field programmable gate arrays (FPGAs). The processors may include be single core or multicore processors. The processing resources of computer system 1200 can be organized into one or more processing units 1232, 1234, etc. A processing unit may include one or more processors, one or more cores from the same or different processors, a combination of cores and processors, or other combinations of cores and processors. In some embodiments, processing subsystem 1204 can include one or more special purpose co-processors such as graphics processors, digital signal processors (DSPs), or the like. In some embodiments, some or all of the processing units of processing subsystem 1204 can be implemented using customized circuits, such as application specific integrated circuits (ASICs), or field programmable gate arrays (FPGAs).

In some embodiments, the processing units in processing subsystem 1204 can execute instructions stored in system memory 1210 or on computer readable storage media 1222. In various embodiments, the processing units can execute a variety of programs or code instructions and can maintain multiple concurrently executing programs or processes. At any given time, some or all of the program code to be executed can be resident in system memory 1210 and/or on computer-readable storage media 1222 including potentially on one or more storage devices. Through suitable programming, processing subsystem 1204 can provide various functionalities described above. In instances where computer system 1200 is executing one or more virtual machines, one or more processing units may be allocated to each virtual machine.

In certain embodiments, a processing acceleration unit 1206 may optionally be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term input device is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1200 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information and data that is used by computer system 1200. Storage subsystem 1218 provides a tangible non-transitory computer-readable storage medium for storing the basic programming and data constructs that provide the functionality of some embodiments. Storage subsystem 1218 may store software (e.g., programs, code modules, instructions) that when executed by processing subsystem 1204 provides the functionality described above. The software may be executed by one or more processing units of processing subsystem 1204. Storage subsystem 1218 may also provide a repository for storing data used in accordance with the teachings of this disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM may contain data and/or program modules that are presently being operated and executed by processing subsystem 1204. In some implementations, system memory 1210 may include multiple different types of memory, such as static random access memory (SRAM), dynamic random access memory (DRAM), and the like.

By way of example, and not limitation, as depicted in FIG. 12, system memory 1210 may load application programs 1212 that are being executed, which may include various applications such as Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1222 may store programming and data constructs that provide the functionality of some embodiments. Computer-readable media 1222 may provide storage of computer-readable instructions, data structures, program modules, and other data for computer system 1200. Software (programs, code modules, instructions) that, when executed by processing subsystem 1204 provides the functionality described above, may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1218 may also include a computer-readable storage media reader 1220 that can further be connected to computer-readable storage media 1222. Reader 1220 may receive and be configured to read data from a memory device such as a disk, a flash drive, etc.

In certain embodiments, computer system 1200 may support virtualization technologies, including but not limited to virtualization of processing and memory resources. For example, computer system 1200 may provide support for executing one or more virtual machines. In certain embodiments, computer system 1200 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1200. Accordingly, multiple operating systems may potentially be run concurrently by computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices. For example, the communication subsystem may be used to transmit a message between a user and a chatbot that the user is conversing with.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

Communication subsystem 1224 can receive and transmit data in various forms. For example, in some embodiments, in addition to other forms, communications subsystem 1224 may receive input communications in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to communicate data from computer system 1200 to other computer systems or networks. The data may be communicated in various different forms such as structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, by a chatbot system that is computer-implemented, an input utterance from a user;
   determining, by the chatbot system and based on a set of templates associated with two or more chatbots in the chatbot system, that the input utterance is representative of a first task that a first chatbot in the chatbot system is configured to perform, wherein the determining comprises:
   comparing the input utterance to a first template in the set of templates, wherein:
      the first template is associated with the first chatbot, and the first template is generated by: identifying one or more example utterances representative of the first task that the first chatbot is configured to perform, generating, for each utterance of the one or more example utterances representative of the first task, an initial template as a regular expression that includes a string pattern, repeatedly performing at least one of sentence level or word level generalization on the generated initial templates until no further reduction of the initial templates can be performed to generate the first template, and confirming that the first template does not conflict with one or more templates associated with other chatbots in the chatbot system,
      the first template is a regular expression that includes a string pattern,
      the string pattern corresponds to a generalized form of one or more example utterances that have been provided for the first chatbot, and
      the one or more example utterances are representative of the first task that the first chatbot is configured to perform;
   calculating a degree of match between the input utterance and the first template;
   comparing the input utterance to a second template in the set of templates, wherein the second template is associated with a second chatbot in the chatbot system, and the second template is representative of a second task that the second chatbot in the chatbot system is configured to perform;
   calculating a degree of match between the input utterance and the second template; and
   selecting the first chatbot over the second chatbot for processing the input utterance in response to determining that the degree of match between the input utterance and the first template is greater than the degree of match between the input utterance and the second template; and
   responsive to determining that the input utterance is representative of the task that the first chatbot is configured to perform, communicating, by the chatbot system, at least part of the input utterance as input to the first chatbot.

2. The method of claim 1, wherein the first template includes linguistic part-of-speech information indicating parts-of-speech for different elements of the string pattern.

3. The method of claim 2, wherein determining that the input utterance is representative of the task that the first chatbot is configured to perform further comprises:
   determining that elements of the input utterance have the same part-of-speech as corresponding elements of the string pattern.

4. The method of claim 1, wherein determining that the input utterance is representative of the task that the first chatbot is configured to perform further comprises:

determining scores for individual words in the input utterance, where a score for a word indicates a likelihood that the word is representative of a particular task that a chatbot is configured to perform; and identifying, based on the scores for the individual words in the input utterance, the set of templates as a subset of a larger set of templates.

5. The method of claim 1, wherein at least one instance of sentence level or word level generalization involves determining a pattern that applies to two or more string patterns.

6. The method of claim 5, wherein the determined pattern groups together synonyms as alternative template elements.

7. The method of claim 1, wherein at least one instance of sentence level or word level generalization involves:

determining that a particular element of a string pattern is one of multiple possible values for a named entity that has been configured for the first chatbot; and replacing the particular element with the named entity.

8. The method of claim 1, wherein at least one instance of sentence level or word level generalization involves:

identifying an element of a first string pattern as being optional based on: (i) the element not appearing in a longest common subsequence between the first string pattern and a second string pattern, or (ii) a part-of-speech of the element.

9. The method of claim 1, wherein generating the first template further includes:

determining that a first string pattern derived during a particular instance of sentence level or word level generalization is invalid due to the first string pattern being identical to a second string pattern that is representative of a different task than the first string pattern.

10. A computer system comprising:

one or more processors; and a memory coupled to the one or more processors, the memory storing instructions that, when executed by the one or more processors, cause the one or more processors to perform processing comprising:

receiving an input utterance from a user;

determining, based on a set of templates associated with two or more chatbots in a chatbot system, that the input utterance is representative of a first task that a first chatbot is configured to perform, wherein the determining comprises:

comparing the input utterance to a first template in the set of templates, wherein:

the first template is associated with the first chatbot, and the first template is generated by: identifying one or more example utterances representative of the first task that the first chatbot is configured to perform, generating, for each utterance of the one or more example utterances representative of the first task, an initial template as a regular expression that includes a string pattern, repeatedly performing at least one of sentence level or word level generalization on the generated initial templates until no further reduction of the initial templates can be performed to generate the first template, and confirming that the first template does not conflict with one or more templates associated with other chatbots in the chatbot system, the first template is a regular expression that includes a string pattern, the string pattern corresponds to a generalized form of one or more example utterances that have been provided for the first chatbot, and the one or more example utterances are representative of the first task that the first chatbot is configured to perform;

calculating a degree of match between the input utterance and the first template;

comparing the input utterance to a second template in the set of templates, wherein the second template is associated with a second chatbot in the chatbot system, and the second template is representative of a second task that the second chatbot in the chatbot system is configured to perform;

calculating a degree of match between the input utterance and the second template;

selecting the first chatbot over the second chatbot for processing the input utterance in response to determining that the degree of match between the input utterance and the first template is greater than the degree of match between the input utterance and the second template; and responsive to determining that the input utterance is representative of the task that the first chatbot is configured to perform, communicating at least part of the input utterance as input to the first chatbot.

11. The computer system of claim 10, wherein the first template includes linguistic part-of-speech information indicating parts-of-speech for different elements of the string pattern.

12. The computer system of claim 11, wherein determining that the input utterance is representative of the task that the first chatbot is configured to perform further comprises:

determining that elements of the input utterance have the same part-of-speech as corresponding elements of the string pattern.

13. The computer system of claim 10, wherein determining that the input utterance is representative of the task that the first chatbot is configured to perform further comprises:

determining scores for individual words in the input utterance, where a score for a word indicates a likelihood that the word is representative of a particular task that a chatbot is configured to perform; and identifying, based on the scores for the individual words in the input utterance, the set of templates as a subset of a larger set of templates.

14. The computer system of claim 10, wherein at least one instance of sentence level or word level generalization involves determining a pattern that applies to two or more string patterns.

15. The computer system of claim 10, wherein generating the first template further includes:

determining that a first string pattern derived during a particular instance of sentence level or word level generalization is invalid due to the first string pattern being identical to a second string pattern that is representative of a different task than the first string pattern.

16. A non-transitory computer-readable memory storing instructions that, when executed by one or more processors within a computer system, cause the one or more processors to perform processing comprising:

receiving an input utterance from a user;

determining, based on a set of templates associated with two or more chatbots in a chatbot system, that the input utterance is representative of a first task that a first chatbot is configured to perform, wherein the determining comprises:

comparing the input utterance to a first template in the set of templates, wherein:

the first template is associated with the first chatbot, and
the first template is generated by: identifying one or more example utterances representative of the first task that the first chatbot is configured to perform, generating, for each utterance of the one or more example utterances representative of the first task, an initial template as a regular expression that includes a string pattern, repeatedly performing at least one of sentence level or word level generalization on the generated initial templates until no further reduction of the initial templates can be performed to generate the first template, and confirming that the first template does not conflict with one or more templates associated with other chatbots in the chatbot system, the first template is a regular expression that includes a string pattern, the string pattern corresponds to a generalized form of one or more example utterances that have been provided for the first chatbot, and the one or more example utterances are representative of the first task that the first chatbot is configured to perform;

calculating a degree of match between the input utterance and the first template;

comparing the input utterance to a second template in the set of templates, wherein the second template is associated with a second chatbot in the chatbot system, and the second template is representative of a second task that the second chatbot in the chatbot system is configured to perform;

calculating a degree of match between the input utterance and the second template; and selecting the first chatbot over the second chatbot for processing the input utterance in response to determining that the degree of match between the input utterance and the first template is greater than the degree of match between the input utterance and the second template; and responsive to determining that the input utterance is representative of the task that the first chatbot is configured to perform, communicating at least part of the input utterance as input to the first chatbot.

17. The non-transitory computer-readable memory of claim 16, wherein the first template includes linguistic part-of-speech information indicating parts-of-speech for different elements of the string pattern.

* * * * *

UNITED STATES PATENT AND TRADEMARK OFFICE
CERTIFICATE OF CORRECTION

| | |
|---|---|
| PATENT NO. | : 11,694,032 B2 |
| APPLICATION NO. | : 17/011296 |
| DATED | : July 4, 2023 |
| INVENTOR(S) | : McRitchie et al. |

It is certified that error appears in the above-identified patent and that said Letters Patent is hereby corrected as shown below:

On the Title Page

Column 1, under Assignee, Line 2, delete "Redwoood Shores," and insert -- Redwood Shores, --, therefor.

Signed and Sealed this
Twenty-eighth Day of May, 2024

Katherine Kelly Vidal
*Director of the United States Patent and Trademark Office*